United States Patent
Izawa et al.

(10) Patent No.: US 11,345,601 B2
(45) Date of Patent: May 31, 2022

(54) CARBONACEOUS MATERIAL FOR NEGATIVE POLE ACTIVE SUBSTANCE OF NONAQUEOUS ELECTROLYTE SECONDARY BATTERY, NEGATIVE POLE FOR NONAQUEOUS ELECTROLYTE SECONDARY BATTERY, NONAQUEOUS ELECTROLYTE SECONDARY BATTERY, AND METHOD FOR PRODUCING CARBONACEOUS MATERIAL

(71) Applicant: KURARAY CO., LTD., Kurashiki (JP)

(72) Inventors: Takafumi Izawa, Kurashiki (JP); Keiichi Nishimura, Kurashiki (JP); Taketoshi Okuno, Kurashiki (JP); Hideharu Iwasaki, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 266 days.

(21) Appl. No.: 16/322,240

(22) PCT Filed: Aug. 2, 2017

(86) PCT No.: PCT/JP2017/028099
§ 371 (c)(1),
(2) Date: Feb. 1, 2019

(87) PCT Pub. No.: WO2018/034155
PCT Pub. Date: Feb. 22, 2018

(65) Prior Publication Data
US 2019/0194024 A1    Jun. 27, 2019

(30) Foreign Application Priority Data
Aug. 16, 2016 (JP) .............................. JP2016-159707
Aug. 16, 2016 (JP) .............................. JP2016-159708

(51) Int. Cl.
*C01B 32/318*     (2017.01)
*H01M 4/587*      (2010.01)
(Continued)

(52) U.S. Cl.
CPC ............ *C01B 32/318* (2017.08); *C01B 32/30* (2017.08); *C01B 32/336* (2017.08);
(Continued)

(58) Field of Classification Search
None
See application file for complete search history.

(56) References Cited

U.S. PATENT DOCUMENTS 6,303,249 B1    10/2001    Sonobe et al.
2015/0180020 A1    6/2015    Komatsu et al.
(Continued)

FOREIGN PATENT DOCUMENTS

CN    104412426 A    3/2015
EP    0 767 505 A1    4/1997
(Continued)

OTHER PUBLICATIONS

International Search Report dated Nov. 7, 2017 in PCT/JP2017/028099 filed Aug. 2, 2017.
(Continued)

*Primary Examiner* — Guinever S Gregorio
(74) *Attorney, Agent, or Firm* — Oblon, McClelland, Maier & Neustadt, L.L.P.

(57) ABSTRACT

The present invention relates to a carbonaceous material that is suitable for the negative pole active substance of a nonaqueous electrolyte secondary battery, a negative pole for a nonaqueous electrolyte secondary battery comprising the carbonaceous material, a nonaqueous electrolyte secondary battery having the negative pole, and a method for producing the carbonaceous material. This carbonaceous (Continued)

material is for a negative pole active substance of a non-aqueous electrolyte secondary battery. The carbonaceous material is derived from plants, the half-width of the peak at approximately 1360 cm-1 of the Raman spectrum observed by laser Raman spectroscopy is 190 to 240 cm-1, and the specific surface area as found by multipoint BET analysis of nitrogen adsorption is 10 to 100 m2/g.

7 Claims, 3 Drawing Sheets

(51) Int. Cl.
    *C01B 32/336* (2017.01)
    *C01B 32/30* (2017.01)
    *H01M 4/04* (2006.01)
    *H01M 4/02* (2006.01)

(52) U.S. Cl.
    CPC ......... *H01M 4/0471* (2013.01); *H01M 4/587* (2013.01); *H01M 2004/027* (2013.01); *H01M 2220/20* (2013.01)

(56) References Cited

U.S. PATENT DOCUMENTS

2015/0188137 A1   7/2015   Komatsu et al.
2015/0263347 A1   9/2015   Imaji et al.
2016/0064735 A1   3/2016   Tada et al.
2016/0344030 A1*  11/2016  Sakshaug ............ H01M 4/1393

FOREIGN PATENT DOCUMENTS

| | | |
|---|---|---|
| JP | 9-161801 A | 6/1997 |
| JP | 10-21919 A | 1/1998 |
| JP | 11-135108 A | 5/1999 |
| JP | 2014-192150 A | 10/2014 |
| JP | 2015-164110 A | 9/2015 |
| JP | 2015-230915 A | 12/2015 |
| JP | 2016-152222 A | 8/2016 |
| WO | WO 2014/034857 A1 | 3/2014 |
| WO | WO 2014/034858 A1 | 3/2014 |
| WO | WO 2014/038491 A1 | 3/2014 |
| WO | WO 2014/038492 A1 | 3/2014 |
| WO | WO 2015/129200 A1 | 9/2015 |

OTHER PUBLICATIONS

English Translation of the International Preliminary report on Patentability and written opinion dated Feb. 28, 2019 in the corresponding PCT/JP2017/028099 filed Aug. 2, 2017, 8 pages.

Combined Chinese Office Action and Search Report dated Sep. 28, 2021 in corresponding Chinese Patent Application No. 201780049870.X (with English Translation and English Translation of Category of Cited Documents), 14 pages.

\* cited by examiner

[Figure 1]
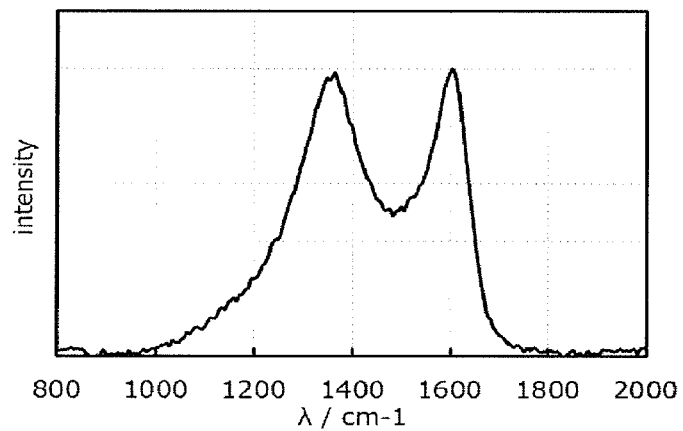
[Figure 2]
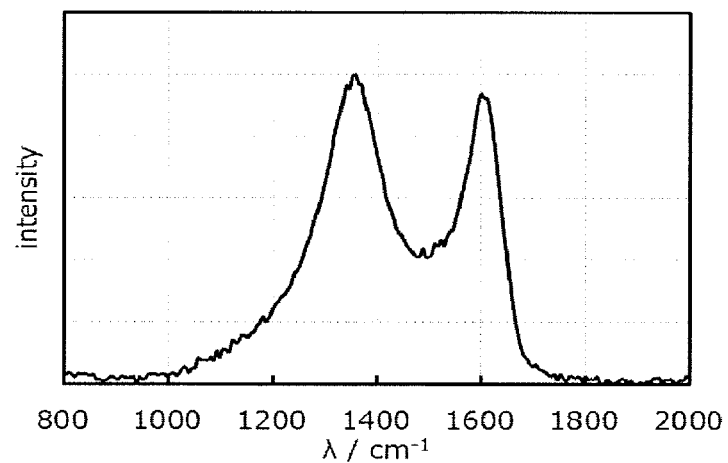
[Figure 3]
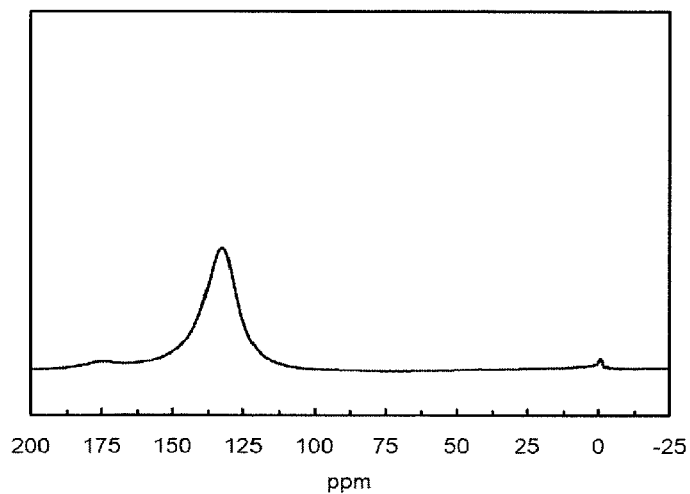

[Figure 4]
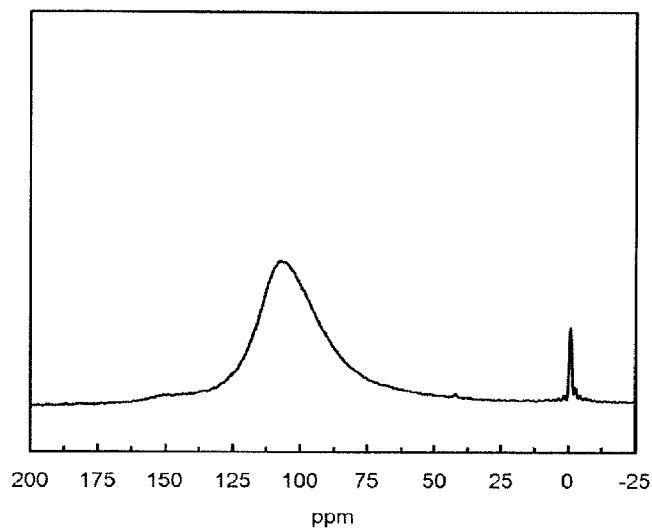
[Figure 5]
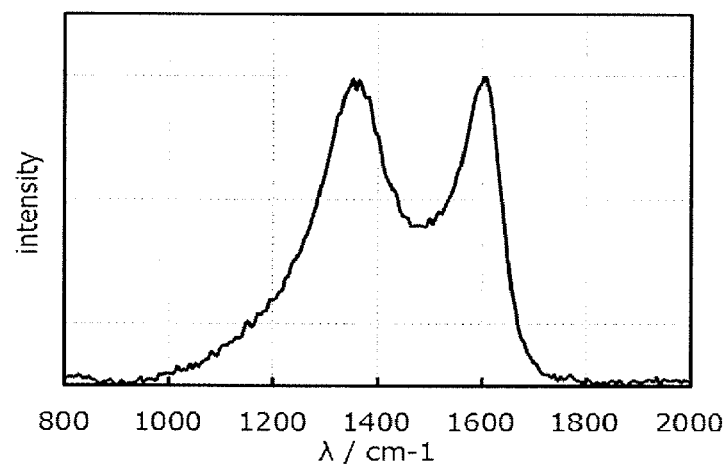
[Figure 6]
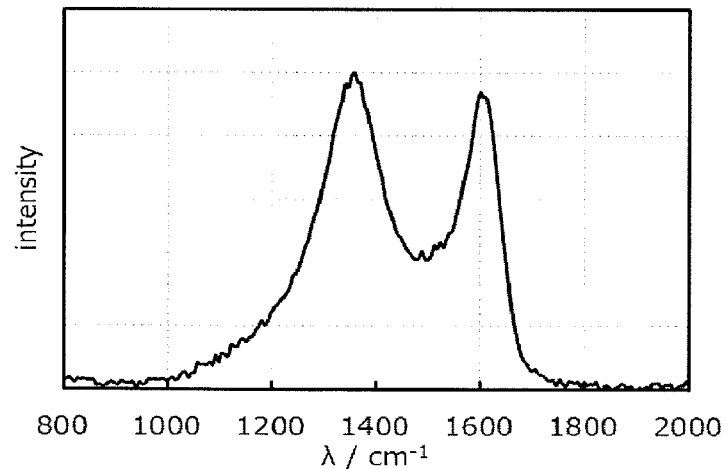

[Figure 7]
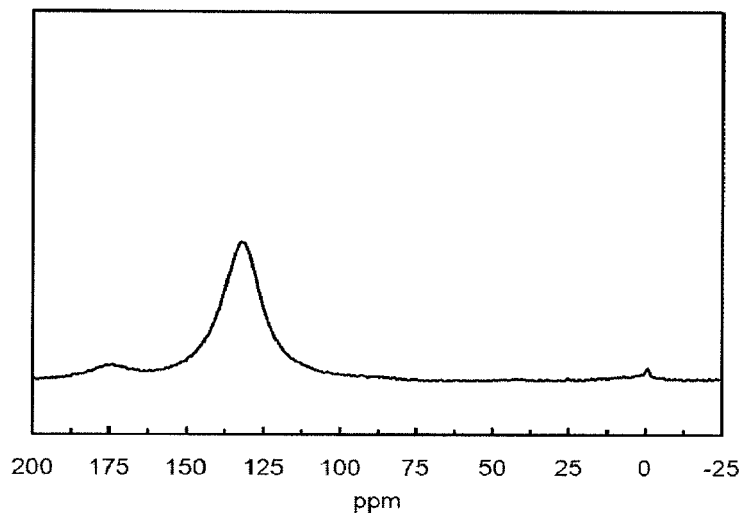
[Figure 8]
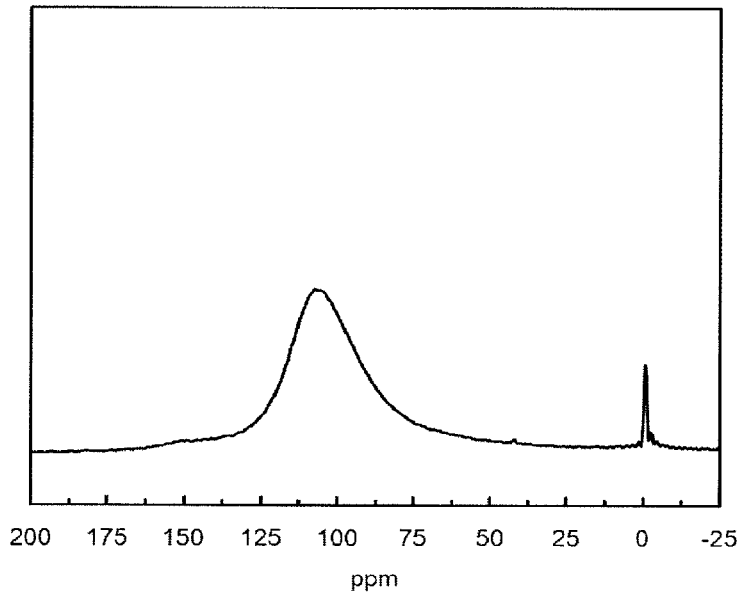

CARBONACEOUS MATERIAL FOR NEGATIVE POLE ACTIVE SUBSTANCE OF NONAQUEOUS ELECTROLYTE SECONDARY BATTERY, NEGATIVE POLE FOR NONAQUEOUS ELECTROLYTE SECONDARY BATTERY, NONAQUEOUS ELECTROLYTE SECONDARY BATTERY, AND METHOD FOR PRODUCING CARBONACEOUS MATERIAL

TECHNICAL FIELD

The present invention relates to a carbonaceous material suitable for a negative pole active substance of a nonaqueous electrolyte secondary battery, a negative pole for a nonaqueous electrolyte secondary battery comprising the carbonaceous material, a nonaqueous electrolyte secondary battery having the negative pole, and a method for producing the carbonaceous material.

BACKGROUND ART

Nonaqueous electrolyte secondary batteries such as a lithium ion secondary battery are widely used in small mobile devices such as a mobile phone and a notebook personal computer because the energy density thereof is high and the output property thereof is excellent. Application thereof to an on-vehicle use has also been recently advanced for a hybrid automobile, an electric automobile, and the like. A non-graphitizable carbon capable of being doped (charged) with and being dedoped of (discharging) lithium in an amount exceeding the theoretical capacity of graphite of 372 mAh/g has been developed as a negative pole material for the lithium ion secondary battery (see, e.g., Patent Document 1) and has been used.

The non-graphitizable carbon can be obtained using, for example, petroleum pitch, coal pitch, a phenol resin, a plant, or the like as its carbon sources. Among these carbon sources, the plant is a raw material capable of being sustainably and stably supplied by being cultivated, is inexpensively available, and is therefore very useful. Since a carbonaceous material obtained by calcining a carbon material derived from a plant has many pores present therein, an excellent charge-discharge capacity is expected.

When a carbonaceous material is obtained using a carbon material derived from a plant, an attempt has been made before the calcining to reduce the amount of potassium derived from the plant. For example, Patent Document 2 discloses a carbonaceous material that is obtained by immersing and treating a carbon precursor in an acid such as hydrochloric acid or water and thereafter carbonizing this carbon precursor. Patent Document 3 discloses a carbonaceous material that is obtained by applying thermal treatment to an organic substance derived from a plant under an inert gas atmosphere containing a halogen compound and thereafter applying the main calcining to the organic substance.

Patent Document 4 discloses a carbon material for a lithium secondary battery, obtained by applying halogenation treatment, preliminary pore adjustment treatment, dehalogenation treatment, and pore adjustment treatment to carbonized coal, aiming at improving the charge and discharge property of the lithium ion secondary battery.

Patent Document 1: JP 9-161801 A
Patent Document 2: JP 10-21919 A
Patent Document 3: WO 2014/034858 A
Patent Document 4: JP 11-135108 A

DISCLOSURE OF THE INVENTION

Problems to be Solved by the Invention

Application of the lithium ion secondary battery to an on-vehicle use and the like has recently been discussed and a further increase of the capacity of the lithium ion secondary battery is demanded. To further improve the input-output characteristics of a nonaqueous electrolyte secondary battery, a carbonaceous material is needed that provides a battery having high charge-discharge efficiency and low internal resistance.

An object of the present invention is therefore to provide a carbonaceous material suitable for a negative pole active substance of a nonaqueous electrolyte secondary battery (such as, for example, a lithium ion secondary battery) that has a high charge-discharge capacity, high charge-discharge efficiency, and low resistance, a negative pole comprising the carbonaceous material, a nonaqueous electrolyte secondary battery having the negative pole, and a method for producing the carbonaceous material.

Another object of the present invention is to provide a carbonaceous material suitable for a negative pole active substance of a nonaqueous electrolyte secondary battery (such as, for example, a lithium ion secondary battery) that has a high charge-discharge capacity, high charge-discharge efficiency, and that has low resistance maintained even after charge and discharge cycle, a negative pole comprising the carbonaceous material, a nonaqueous electrolyte secondary battery having the negative pole, and a method for producing the carbonaceous material.

Means for Solving Problems

The inventors found that the above objects were able to be accomplished by using the carbonaceous material of the present invention described below.

The present invention includes the following preferred embodiments.

[1] A carbonaceous material for a negative pole active substance of a nonaqueous electrolyte secondary battery, wherein the carbonaceous material is derived from a plant, wherein a value of the half-value width of a peak in the vicinity of 1,360 cm$^{-1}$ in a Raman spectrum observed using laser Raman spectroscopy is 190 to 240 cm$^{-1}$, and wherein a specific surface area determined in accordance with a nitrogen adsorption BET multipoint method is 10 to 100 m$^2$/g.

[2] The carbonaceous material described in [1], wherein when lithium is doped into said carbonaceous material until a full charge state is established and a $^7$Li nucleus solid-state NMR analysis is conducted for the carbonaceous material, a main resonance peak is observed that is shifted toward a low magnetic field side by 115 to 145 ppm relative to a resonance peak of a reference substance LiCl.

[3] The carbonaceous material described in [1] or [2], wherein a calcium element content is 50 ppm or less.

[4] The carbonaceous material described in any one of [1] to [3], wherein a true density determined in accordance with a butanol method is 1.35 to 1.70 g/cm$^3$.

[5] The carbonaceous material described in any one of [1] to [4], wherein a ratio of a meso pore volume to a micro pore volume each calculated in accordance with a DFT method is 1.0 or greater.

[6] A negative pole for a nonaqueous electrolyte secondary battery comprising the carbonaceous material described in any one of [1] to [5].

[7] A nonaqueous electrolyte secondary battery having the negative pole for a nonaqueous electrolyte secondary battery described in [6].

[8] A method for producing the carbonaceous material described in any one of [1] to [5], comprising the step of applying thermal treatment to a char derived from a plant at 1,100 to 1,300° C. in a gas flow of an inert gas containing a halogen compound, wherein a supply amount of the inert gas containing a halogen compound is 14 L/min or more per 50 g of the char derived from a plant.

Effect of the Invention

The nonaqueous electrolyte secondary battery using the negative pole comprising the carbonaceous material of the present invention has a high charge-discharge capacity, high charge-discharge efficiency, and low resistance. In a preferred embodiment of the present invention, the nonaqueous electrolyte secondary battery using the negative pole comprising the carbonaceous material has a high charge-discharge capacity, high charge-discharge efficiency, and, especially, low resistance maintained even after charge and discharge cycle.

BRIEF DESCRIPTION OF DRAWINGS

FIG. 1 is a chart of a Raman spectrum of the carbonaceous material of Example 1.

FIG. 2 is a chart of a Raman spectrum of the carbonaceous material of Comparative Example 1.

FIG. 3 is a chart of a $^7$Li nucleus solid-state NMR spectrum of the carbonaceous material of Example 1.

FIG. 4 is a chart of a $^7$Li nucleus solid-state NMR spectrum of the carbonaceous material of Comparative Example 1.

FIG. 5 is a chart of a Raman spectrum of the carbonaceous material of Example 6.

FIG. 6 is a chart of a Raman spectrum of the carbonaceous material of Comparative Example 5.

FIG. 7 is a chart of a $^7$Li nucleus solid-state NMR spectrum of the carbonaceous material of Example 6.

FIG. 8 is a chart of the $^7$Li nucleus solid-state NMR spectrum of the carbonaceous material of Comparative Example 5.

MODES FOR CARRYING OUT THE INVENTION

An embodiment of the present invention will be described below in detail. The scope of the present invention is not limited to the embodiment described herein and various changes can be made thereto within the scope not detracting the gist of the present invention.

A carbonaceous material of the present invention is derived from a plant and can be produced by, for example, applying thermal treatment to a char derived from a plant in a gas flow of an inert gas containing a halogen compound. The "char" generally refers to a solid in a powder form being rich in a carbon content and not being melt-softened, which is obtained when coal is heated, while "char" as used herein also refers to a solid in a powder form being rich in a carbon content and not being melt-softened, which is obtained by heating an organic substance.

The plant to be the raw material of the char derived from a plant (hereinafter, also referred to as "plant raw material") is not especially limited. Examples thereof include, for example, a palm shell, a coffee bean, a tea leaf, a sugar cane, a fruit (such as, for example, mandarin orange or banana), a straw, a rice husk, a broad-leaf tree, a needle-leaf tree, and bamboo. These examples include wastes after being used in their original use (such as, for example, a used tea leaf) or a portion of the plant raw material (such as, for example, skins of banana and mandarin orange). Each of these plants can be used alone, or two or more thereof can be used in combination. Among these plants, the palm shell is preferably used because of its easy availability in a large amount.

The palm shell is not especially limited and examples thereof include, for example, palm shells of palm (oil palm), coconut palm, salak, and double coconut. Each of these palm shells can be used alone, or two or more thereof can be used in combination. The palm shells of coconut palm and palm are especially preferably used that are used as food, a raw material of detergents, a raw material of bio-diesel oil, and the like and that are biomass wastes produced in a large amount.

The method for producing the char from the plant raw material is not especially limited and the char can be produced by, for example, applying thermal treatment (dry distillation) to a plant raw material at 300° C. or higher under an inert gas atmosphere. The char can also be obtained in the form of a char (such as, for example, palm shell char).

As to the carbonaceous material of the present invention, the value of the half-value width of the peak in the vicinity of 1,360 cm$^{-1}$ is 190 to 240 cm$^{-1}$ in a Raman spectrum observed using the laser Raman spectroscopy. The "peak in the vicinity of 1,360 cm$^{-1}$" is a Raman peak generally called "D-band" and is a peak caused by disarrangements or defects of the graphite structure. The peak in the vicinity of 1,360 cm$^{-1}$ is observed in a range of usually 1,345 cm$^{-1}$ to 1,375 cm$^{-1}$ and preferably 1,350 cm$^{-1}$ to 1,370 cm$^{-1}$.

The half-value width of this peak is related to the amount of the disarrangements or defects of the graphite structure included in the carbonaceous material. When the half-value width is smaller than the above lower limit, the disarrangements or defects of the graphite structure included in the carbonaceous material are excessively few and the fine pores between the crystals are therefore reduced due to the development of the graphite structure, resulting in reduction of the lithium ions-occluding sites. Problems therefore arise that the charge-discharge capacity is reduced, and the like. From this viewpoint, the half-value width of the peak in the vicinity of 1,360 cm$^{-1}$ is preferably 195 cm$^{-1}$ or larger and more preferably 200 cm$^{-1}$ or larger. When the half-value width is larger than the above upper limit, the disarrangements or defects of the graphite structure included in the carbonaceous material are increased, amorphous portions are increased, and the carbon edges are increased, resulting in an increase of the reactive groups on the ends of carbon that react with lithium. The use efficiency of lithium ions is therefore decreased, and the charge-discharge efficiency is decreased. From this viewpoint, the half-value width of the peak in the vicinity of 1,360 cm$^{-1}$ is preferably 235 cm$^{-1}$ or smaller and more preferably 230 cm$^{-1}$ or smaller.

The measurement of a Raman spectrum is conducted using a Raman spectrometer (such as, for example, a Raman spectrometer "LabRAM ARAMIS (VIS)" manufactured by Horiba, Ltd.). Concretely, for example, the particles to be measured are set on a stage of an observation stand, the magnifying power of the objective lens is set so as to be 100 magnifications, focusing is conducted, the measurement is conducted while applying an argon ion laser beam of 532 nm to the inside of a measurement cell for an exposure time period of 1 second, with a cumulative number of 100, and in a measurement range of 50 to 2,000 cm$^{-1}$.

The method for adjusting the half-value width of the peak in the vicinity of 1,360 cm$^{-1}$ within the above ranges is not limited at all. As such a method, for example, a method of applying thermal treatment to a char derived from a plant at a temperature of 1,100 to 1,300° C. while supplying an inert gas containing a halogen compound in an amount of 14 L/min or more per 50 g of the char, and a method of applying thermal treatment to a char derived from a plant and having an alkali metal impregnated therein, at a temperature of 1,100 to 1,300° C. while supplying an inert gas containing a halogen compound can be used.

As to the carbonaceous material of the present invention, the specific surface area determined in accordance with a nitrogen adsorption BET multipoint method is 10 to 100 m$^2$/g. When the specific surface area is smaller than the above lower limit, the adsorption amount of the lithium ions onto the carbonaceous material becomes small and the charge capacity of the nonaqueous electrolyte secondary battery becomes small. In addition, the contact area between the carbonaceous material and an electrolytic solution becomes small, the lithium ions therefore are difficult to move, and thus any sufficient input-output characteristics cannot be obtained. From this viewpoint, the specific surface area determined in accordance with the nitrogen adsorption BET multipoint method is preferably 10 m$^2$/g or larger and more preferably 15 m$^2$/g or larger. When the specific surface area is larger than the above upper limit, the lithium ions react on the surface of the carbonaceous material to be consumed and the use efficiency of lithium ions is therefore decreased. In addition, the hygroscopic property of the carbonaceous material is difficult to decrease and, due to the moisture present in the carbonaceous material, problems tend to arise such as generation of an acid associated with hydrolysis of the electrolytic solution and generation of gases due to electrolysis of water. Furthermore, oxidation of the carbonaceous material may progress under an air atmosphere and the performance of the battery may significantly vary. From this viewpoint, the specific surface area determined in accordance with the nitrogen adsorption BET multipoint method is preferably 100 m$^2$/g or smaller and is more preferably 90 m$^2$/g or smaller. The specific surface area determined in accordance with the nitrogen adsorption BET multipoint method can be measured by a method described later.

The method for adjusting the specific surface area within the above ranges is not limited at all. The specific surface area can be adjusted by, for example, controlling the temperature of the thermal treatment at a gas phase demineralization step. When the temperature of the thermal treatment at the gas phase demineralization step is set to be high or the time period of the thermal treatment is set to be long, the specific surface area tends to become small. Therefore, the temperature and the time period may be adjusted so as to obtain a specific surface area in the above ranges.

As to the carbonaceous material of the present invention, when lithium is doped into the carbonaceous material until the full charge state is established and a $^7$Li nucleus solid-state NMR analysis is conducted therefor, it is preferred that a main resonance peak is observed that is shifted toward the low magnetic field side by 115 to 145 ppm relative to a resonance peak of a reference substance LiCl. A large value of the shift toward the low magnetic field side of the main resonance peak represents the fact that the amount of lithium present as clusters is large. As to the carbonaceous material of the present invention, from the viewpoint that rapid disassociation of clusters and rapid charge and discharge may be easily achieved, the value of the shift toward the low magnetic field side is more preferably 142 ppm or smaller and further more preferably 138 ppm or smaller. A small value of the shift toward the low magnetic field side of the main resonance peak represents the fact that the amount of lithium present between carbon layers is large. From the viewpoint that the charge-discharge capacity may be easily increased, the value of the shift toward the low magnetic field side is preferably 120 ppm or larger.

In the present invention, "the main resonance peak is observed" means that lithium species providing the main resonance peak are present at 3% that is the detection limit of the $^7$Li nucleus solid-state NMR analysis described later, or more.

In the present invention, "lithium is doped until the full charge state is established" means that a nonaqueous electrolyte secondary battery with an electrode comprising the carbonaceous material as its positive pole and an electrode comprising metallic lithium as its negative pole is assembled and charging is conducted therefor setting the ending voltage to a range of usually 0.1 to 0 mV, preferably 0.05 to 0 mV, and more preferably 0.01 to 0 mV. In the present invention, the carbonaceous material in the full charge state has a capacity of usually 300 to 600 mAh/g and preferably 350 to 580 mAh/g.

The details of the method for measuring the $^7$Li nucleus solid-state NMR spectrum are as described later and the NMR spectrum can be measured using a nuclear magnetic resonance apparatus (such as, for example, "AVANCE 300" manufactured by BRUKER).

The method for adjusting the value of the chemical shift toward the low magnetic field side of the main resonance peak within the above ranges is not limited at all. For example, a method can be used in which thermal treatment is applied to a char derived from a plant at a temperature of 1,100 to 1,300° C. supplying thereto an inert gas containing a halogen compound in an amount of 14 L/min or more per 50 g of the char.

As to the carbonaceous material of the present invention, the calcium element content is preferably 50 ppm or less, more preferably 40 ppm or less, and further more preferably 35 ppm or less. When the calcium element content is equal to or less than the above upper limit, problems such as a short circuit of the battery may be easily suppressed that may be generated by elution of the calcium element into the electrolytic solution and reprecipitation thereof. In addition, since the pores of the carbonaceous material are difficult to be blocked, the charge-discharge capacity of the battery can be easily maintained. The lesser the calcium element content is, the more preferable it is. It is especially preferable that the carbonaceous material substantially contains no calcium element. "The carbonaceous material substantially contains no calcium element" means that the calcium element content is 10$^{-6}$% by mass that is the detection limit of the element analysis method described later (an inert gas fusion-thermal conductivity method), or less.

The method for adjusting the calcium element content within the above range is not limited at all. For example, a method can be used in which thermal treatment is applied to a char derived from a plant, supplying thereto an inert gas that contains a halogen compound.

The details of the measurement of the calcium element content are as described in the Examples and the calcium element content can be measured using an X-ray fluorescence analyzer (such as, for example, "ZSX Primus-μ" manufactured by Rigaku Corporation).

As to the carbonaceous material of the present invention, the potassium element content is preferably 50 ppm or less, more preferably 30 ppm or less, and further more preferably 10 ppm or less. When the calcium element content is equal to or less than the above upper limit, problems such as a short circuit of the battery may be easily suppressed that may be generated by elution of the potassium element into the electrolytic solution and reprecipitation thereof. In addition, since the pores of the carbonaceous material are difficult to be blocked, the charge-discharge capacity of the battery can be easily maintained. The lesser the potassium element content is, the more preferable it is. It is especially preferable that the carbonaceous material substantially contains no potassium element. "The carbonaceous material substantially contains no potassium element" means that the potassium element content is $10^{-6}$% by mass that is the detection limit of the element analysis method described later (an inert gas fusion-thermal conductivity method), or less. The method for adjusting the potassium element content within the above range is not limited at all. For example, a method can be used in which thermal treatment is applied to a char derived from a plant, supplying thereto an inert gas that contains a halogen compound. The potassium element content can be measured in the same manner as the calcium element content.

As to the carbonaceous material of the present invention, from the viewpoint that the capacity per mass of the battery is set to be large, the true density $\rho_{Bt}$ by a butanol method is preferably 1.35 to 1.70 g/cm$^3$, more preferably 1.40 to 1.65/cm$^3$, and further more preferably 1.44 to 1.60/cm$^3$. The details of the measurement of the true density $\rho_{Bt}$ are as described in the Examples and the true density $\rho_{Bt}$ can be measured using a butanol method in accordance with a method defined in JIS R 7212. The carbonaceous material having such a true density can be produced by, for example, calcining a char derived from a plant at 1,100 to 1,300° C.

As to the carbonaceous material of the present invention, the meso pore volume calculated in accordance with a DFT method is preferably 0.005 to 0.1 mL/g, more preferably 0.01 to 0.085 mL/g, and further more preferably 0.01 to 0.07 mL/g. When the meso pore volume is equal to or more than the above lower limit, this is preferable because the electrolytic solution may easily infiltrate and thus reduction of the resistance may be enabled, and any blocking of the pores caused by the decomposed substances produced during charge and discharge cycle may be easily suppressed and thus any increase of the resistance may be easily avoided. When the meso pore volume is equal to or less than the above upper limit, this is preferable because any reduction of the bulk density can be suppressed and the electrode density may be easily increased. The "meso pore" as used herein is a pore that has a pore size (the pore diameter) of 2 nm to 50 nm in accordance with the DFT method.

As to the carbonaceous material of the present invention, the micro pore volume calculated in accordance with a DFT method is preferably 0.001 to 0.1 mL/g, more preferably 0.003 to 0.05 mL/g, and further more preferably 0.005 to 0.04 mL/g. When the micro pore volume is equal to or more than the above lower limit, this is preferable because the adsorption and the desorption of Li ions may be easily caused. When the micro pore volume is equal to or less than the above upper limit, this is preferable because the reaction between the carbonaceous material and the moisture may be easily suppressed that occurs during the charging and discharging due to adsorption of the moisture. The "micro pore" as used herein is a pore that has a pore size (the pore diameter) of less than 2 nm in accordance with the DFT method.

The DFT method is an analysis method in which an equilibrium density profile of a gas adsorbed on the surface and in the pores of a substance to be adsorbed is calculated utilizing molecular dynamics and a computer simulation method, and thereby adsorption and desorption isothermal lines, adsorption heat, and the like can be calculated. Because this analysis method is applicable to the overall regions of the micro pores and the meso pores, the micro pore volume, the meso pore volume, and the micro pore and the meso pore distributions can simultaneously be measured. In the present invention, the micro pore volume and the meso pore volume can be calculated by applying the DFT method to the nitrogen adsorption and desorption isothermal lines measured using a nitrogen adsorption method.

As to the carbonaceous material of the present invention, the ratio of the meso pore volume to the micro pore volume each calculated using the above method (that is, calculated in accordance with the formula of "the meso pore volume/ the micro pore volume" and, hereinafter, also referred to as "the meso pore volume/the micro pore volume") is preferably 1.0 or greater. When the meso pore volume/the micro pore volume is less than 1.0, a carbonaceous material suitable for assembling a battery with low internal resistance is difficult to obtain and, especially, any low resistance value cannot tend to be maintained when the charging and the discharging are cycled. From this viewpoint, the meso pore volume/the micro pore volume is more preferably 1.3 or greater and further preferably 1.5 or greater. The reason why the above effect is achieved is not clear. However, some of the micro pores are blocked during the charge and discharge cycle and thus the resistance is increased or no more lithium ion can be occluded, whereas such blocking is difficult to be caused in the meso pores each having a larger pore diameter. Therefore, it can be considered that the low resistance value can be maintained by the presence of the meso pore volume in a specific quantity or more. The upper limit of the meso pore volume/the micro pore volume may be, for example, 3.0 or less.

The method for adjusting each of the meso pore volume, the micro pore volume, and the meso pore volume/the micro pore volume within the above ranges is not limited at all. For example, a method can be used in which thermal treatment is applied to a char derived from a plant at a temperature of 1,100 to 1,300° C. supplying thereto an inert gas containing a halogen compound in an amount of 14 L/min or more per 50 g of the char. The carbonaceous material having a desired meso pore volume, a desired micro pore volume, and a desired "the meso pore volume/the micro pore volume" can be obtained by, for example, adjusting the temperature and the time period of said thermal treatment.

From the viewpoint of the coatability in producing the electrode, the average particle diameter ($D_{50}$) of the carbonaceous material of the present invention is preferably 2 to 30 μm. The average particle diameter equal to or larger than the above lower limit is preferable because any increase of the surface area and any enhancement of the reactivity with the electrolytic solution due to the fine powders in the carbonaceous material may be easily suppressed and any increase of the irreversible capacity may be easily suppressed. In addition, when a negative pole is produced using the obtained carbonaceous material, gaps formed between the carbonaceous materials can be secured and thus move of any lithium ion in the electrolytic solution is difficult to be suppressed. From such viewpoints, the average particle diameter ($D_{50}$) of the carbonaceous material of the present invention is more preferably 3 μm or larger, further more preferably 4 μm or larger, especially preferably 5 μm or larger, and most preferably 7 μm or larger. On the other hand, the average particle diameter equal to or less than the above upper limit is preferable because the diffusion free path of each of the lithium ions in the particles may be easily decreased and thus rapid charge and discharge may be easily obtained. Furthermore, for a lithium ion secondary battery, it is important to set the electrode area to be large to improve the input-output characteristics, and it is therefore necessary to control the coating thickness of the active substance onto a current collecting plate to be thin when the electrode is produced. To set the coating thickness to be thin, it is necessary to control the particle diameter of the active substance to be small. From this viewpoint, the average particle diameter is more preferably 20 μm or smaller, further more preferably 18 μm or smaller, especially preferably 16 μm or smaller, and most preferably 15 μm or smaller. "$D_{50}$" is the particle diameter with which the accumulated volume is 50%, and can be determined by, for example, measuring the particle size distribution in accordance with a laser scatter method by use of a particle diameter and particle size distribution measuring apparatus ("Microtrac MT3300EX II" manufactured by MicrotracBEL Corporation).

The carbonaceous material of the present invention can be obtained by, for example, a production method that comprises the step of applying thermal treatment to a char derived from a plant at 1,100 to 1,300° C. in a gas flow of an inert gas containing a halogen compound, in which the supply amount of the inert gas containing a halogen compound is 14 L/min or more per 50 g of the char derived from a plant. The present invention also provides this production method. At the step of applying the thermal treatment to the char derived from a plant in the gas flow of an inert gas containing a halogen compound, demineralization and activation by the halogen compound are conducted and, at the same time, calcining of the carbonaceous material is conducted. This step is hereinafter also referred to as "gas phase demineralization step".

The carbonaceous material of the present invention is derived from a plant as described above. Because a large amount of Li ion can be doped into the carbonaceous material produced from the char derived from a plant, such a carbonaceous material is basically suitable as a material for a negative pole of a nonaqueous electrolyte secondary battery. On the other hand, the char derived from a plant contains a large amount of metal elements contained in the plant. For example, a palm shell char contains the potassium element at about 0.3% and the calcium element at about 0.03%. When the carbonaceous material containing the large amount of such metal elements is used as the negative pole, adverse effects may be achieved on the electrochemical properties and the safety of the nonaqueous electrolyte secondary battery.

The char derived from a plant also contains alkali metals other than potassium (such as, for example, sodium), alkali earth metals (such as, for example, magnesium and calcium), transition metals (such as, for example, iron and copper), and other metals. When the carbonaceous material contains these metals, impurities may elute into the electrolytic solution during the dedoping from the negative pole of the nonaqueous electrolyte secondary battery, which may adversely influence the performance of the battery and may decrease the safety of the battery. In addition, the pores of the carbonaceous material may be blocked by the ash content, which may adversely influence the charge-discharge capacity of the battery.

Conducting the gas phase demineralization step can efficiently remove the potassium element, the calcium element, the iron element, and the like that may have adverse effects on the electrochemical properties and the safety of the nonaqueous electrolyte secondary battery. Conducting this step can also remove the other alkali metals, the other alkali earth metals, and the other transition metals such as copper and nickel.

A halogen compound used at the gas phase demineralization step is not especially limited. Examples thereof include at least one type of compound containing, for example, an element selected from the group consisting of fluorine, chlorine and iodine, and concretely include fluorine, chlorine, bromine, iodine, hydrogen fluoride, hydrogen chloride, hydrogen bromide, iodine bromide, chlorine fluoride (ClF), iodine chloride (ICl), iodine bromide (IBr), bromine chloride (BrCl), and the like. Compounds each generating any of these halogen compounds by thermal decomposition or a mixture of these halogen compounds can also be used. From the viewpoints of the stability of supply and the stability of the used halogen compound, the halogen compound is preferably hydrogen chloride or hydrogen bromide, and more preferably hydrogen chloride.

The inert gas used at the gas phase demineralization step is not especially limited provided that the inert gas is a gas that does not react with the carbon component constituting the char derived from a plant at the temperature of said thermal treatment. Examples thereof include, for example, nitrogen, helium, argon, krypton, or a mixture gas thereof. The inert gas is preferably nitrogen from the viewpoints of the stability of its supply and its economic performance. The lower concentrations of impurity gases (such as, especially, oxygen) contained in the inert gas is, the more preferable it is. The oxygen concentration usually permitted is preferably 0 to 2,000 ppm and more preferably 0 to 1,000 ppm.

The mixing ratios of the halogen compound and the inert gas are not especially limited provided that sufficient demineralization is achieved. For example, from the viewpoints of the safety, the economic performance and the residual property in carbon, the amount of the halogen compound relative to that of the inert gas is preferably 0.01 to 10% by volume, more preferably 0.05 to 8% by volume, and further more preferably 0.1 to 5% by volume. According to the production method of the present invention, no drying treatment needs to be conducted and thus the production method is also industrially advantageous, because the gas phase demineralization step is conducted under the inert gas atmosphere containing a halogen compound. In addition, according to the production method of the present invention, not only the metal elements can be reduced but also the hydrogen element and the oxygen element each on an end of the carbon structure can be reduced, resulting in reduction of the active sites in the carbonaceous material, because the gas phase demineralization step is conducted in the gas flow of the inert gas containing a halogen compound.

The temperature of the thermal treatment at the gas phase demineralization step may be varied depending on the type or the like of the char derived from a plant that is the raw material. From the viewpoints of obtaining a desired carbon structure and a desired demineralization effect, the temperature is preferably 1,100 to 1,300° C., more preferably 1,120 to 1,250° C., and further more preferably 1,150 to 1,200° C. When the temperature of the thermal treatment is excessively low, the demineralization efficiency may be decreased and no sufficient demineralization may be conducted. In addition, no sufficient activation by the halogen compound may be conducted. On the other hand, when the temperature of the thermal treatment is excessively high, this may not be preferable because the effect of thermal shrinkage may become larger than the activation effect by the halogen compound and thus the BET specific surface area may be excessively reduced.

The time period of the thermal treatment at the gas phase demineralization step is not especially limited. From the viewpoints of the economic efficiency of the reaction equipment and the maintenance property of the structure of the carbon content, the time period is, for example, 5 to 300 minutes, preferably 10 to 200 minutes, more preferably 20 to 150 minutes, and further preferably 30 to 150 minutes.

The supply amount of the gas flow of the inert gas containing a halogen compound in the thermal treatment is preferably 14 L/min or more, more preferably 15 L/min or more, and further more preferably 16 L/min or more, per 50 g of the char derived from a plant. When the thermal treatment is conducted with the supply amount equal to or more than the above lower limit, this is preferable because gases generated from the char itself in the thermal treatment are sufficiently removed and the carbonaceous material having the half-value width in the above range may be easily obtained. The upper limit of the supply amount is preferably 25 L/min or less and more preferably 20 L/min or less. When the thermal treatment is conducted with the supply amount equal to or less than the above upper limit, this is preferable because the halogen compound may be easily adsorbed on the char derived from a plant and may easily react with the metal elements, and thus a sufficient demineralization effect may be easily achieved.

When the thermal treatment is applied to the char derived from a plant at a high temperature, gases such as carbon monoxide and hydrogen are generated from the char itself. These gases have high reactivity and it is therefore difficult to control the reaction between the char and the gases generated during the thermal treatment. The reactive gases generated from the char itself can be removed before the gases react with the char by, for example, conducting the thermal treatment with an increased supply amount (with an increased supply rate) of the inert gas as described above. The carbonaceous material having a more controlled carbon structure can therefore be produced.

The mechanism of efficiently removing potassium, calcium, other alkali metals, the alkali earth metals, transition metals, and the like by the gas phase demineralization step is not clear while it can be considered as follows. The metals such as potassium contained in the char derived from a plant react with the halogen compound diffused into the char to produce metallic halides (such as, for example, chlorides and bromides). It can be considered that the produced metallic halides are volatilized (dissipated) by the heating and the demineralization of potassium, calcium, and the like is thereby enabled. It can be considered that, with this mechanism of producing the metallic halides by the diffusion of the halogen compound into the char and the reactions of the halogen compound, potassium, calcium, and the like can efficiently be removed by the high diffusion of the halides in the gas phase. However, the present invention is not limited to the above description.

In the present invention, it is preferred that a step of heating the carbonaceous material under an inert gas atmosphere in the presence of no halogen compound (hereinafter, also referred to as "deacidification treatment") is conducted after the gas phase demineralization step. The metal elements such as the calcium element can efficiently be removed by being brought into contact with the halogen compounds at the gas phase demineralization step. The contact with the halogen compound however causes the halogen to be contained in the carbonaceous material. It is therefore preferred that the deacidification treatment of heating the carbonaceous material in the presence of no halogen compound is conducted, and any halogen contained in the carbonaceous material can be removed by this treatment. Concretely, the deacidification treatment is conducted by heating at usually 800° C. to 1,300° C. under the inert gas atmosphere containing no halogen compound while it is preferred that the temperature of the deacidification treatment is a temperature equal to or higher than the temperature at the gas phase demineralization step. The temperature of the deacidification treatment is preferably 850 to 1,300° C., more preferably 900 to 1,250° C., and further more preferably 1,000 to 1,200° C. For example, the deacidification treatment can be conducted by continuously conducting the thermal treatment discontinuing the supply of the halogen compound after the gas phase demineralization step, and any halogen in the carbonaceous material can thereby be removed. The time period of the deacidification treatment is not especially limited and is preferably 5 minutes to 300 minutes, more preferably 10 minutes to 200 minutes, further more preferably 20 minutes to 150 minutes, and most preferably 30 minutes to 100 minutes.

Examples of the inert gas used in the deacidification treatment include, for example, the gas used at the gas phase demineralization step. From the viewpoint of simplification of the production steps, it is preferred that the inert gas at the gas phase demineralization step and the inert gas in the deacidification treatment is the same as each other. The supply amount (the flowing amount) of the inert gas is not limited. The supply amount thereof is preferably equal to the supply amount of the inert gas at the gas phase demineralization step from the viewpoint of the production.

The apparatus used for the thermal treatment at the gas phase demineralization step is not especially limited provided that the apparatus can heat the char derived from a plant and the inert gas containing the halogen compound while mixing these components with each other. For example, a fluidization furnace can be used, and an intralayer flow scheme of a continuous type or a batch type using a fluidization bed or the like can be used.

In the production method of the present invention, the demineralization and the calcining are concurrently conducted at the gas phase demineralization step and thus no more thermal treatment is necessary. Thermal treatment may however be further conducted at a temperature of, for example, 850° C. to 1,280° C. The treatment time period is, for example, 5 minutes to 300 minutes, more preferably 10 minutes to 200 minutes, further more preferably 10 minutes to 150 minutes, and most preferably 10 minutes to 100 minutes. From the viewpoint that any excessive formation of the pores may be easily avoided and any increase of the resistance may be easily suppressed, it is preferred that the production method of the present invention include no further thermal treatment step at the above treatment temperature after the gas phase demineralization step when the deacidification treatment is not conducted or after the deacidification treatment step when the deacidification treatment is conducted.

The average particle diameter of the carbonaceous material is adjusted through a crushing step and at a classification step when necessary. The crushing step and the classification step may be conducted before the gas phase demineralization step or after the gas phase demineralization step. From the viewpoint of easy enhancement of the uniformness of the gas phase demineralization, it is preferred that the char derived from a plant is crushed before the gas phase demineralization step. When an alkali impregnation step described later is conducted, the char derived from a plant is crushed before the alkali impregnation step and the gas phase demineralization step.

The specific surface area of the char obtained after the crushing step is preferably 100 to 800 m$^2$/g and more preferably 200 to 700 m$^2$/g, and is, for example, 200 to 600 m$^2$/g. It is preferred that the crushing step is conducted such that the char having the specific surface area in the above ranges can be obtained. The specific surface area of the char obtained after the crushing step equal to or more than the above lower limit is preferable because the fine pores of the carbonaceous material may be easily reduced and the hygroscopic property of the carbonaceous material may be easily decreased. When any moisture is present in the carbonaceous material, problems may thereby be caused such as generation of an acid associated with hydrolysis of the electrolytic solution and generation of a gas due to electrolysis of water, oxidation of the carbonaceous material may progress under the air atmosphere, and the performance of the battery may therefore significantly vary. When the specific surface area of the char obtained after the crushing step is equal to or less than the above upper limit, the specific surface area of the obtained carbonaceous material may easily fall into the above range and the use efficiency of the lithium ions in the nonaqueous electrolyte secondary battery can be easily improved. In this specification, the specific surface area of the char and that of the char obtained after the crushing step mean the specific surface areas that are each determined by the nitrogen adsorption BET multipoint method (the BET specific surface area). Concretely, each of those specific surface areas can be measured by the method described below.

The average particle diameter ($D_{50}$) of the char obtained after the crushing step is adjusted such that the carbonaceous material having the above average particle diameter ($D_{50}$) is finally obtained. When the crushing is conducted before the gas phase demineralization step, the char derived from a plant shrinks by about 0 to about 20% due to the gas phase demineralization step. It is therefore preferred that the average particle diameter of the char obtained after the crushing step is adjusted to be a particle diameter that is larger than the desired average particle diameter obtained after the gas phase demineralization step by about 0 to about 20% in order that the average particle diameter of the char obtained after the gas phase demineralization step is adjusted to the range of 2 to 30 µm.

In an embodiment of the production method of the present invention in which crushing is conducted before the gas phase demineralization step, from the viewpoint that the uniformness of the gas phase demineralization can be easily improved, it is preferred that the crushing is conducted such that the average particle diameter ($D_{50}$) of the char obtained after the crushing step is in a range of 2 to 100 µm. When the average particle diameter is 2 µm or larger, fine powders are difficult to be scattered in the furnace during the gas phase demineralization, the recovery rate of the produced carbonaceous material can be excellent, and any load on the apparatus can be suppressed. From the same viewpoint, the average particle diameter ($D_{50}$) of the char obtained after the crushing step is more preferably 3 µm or larger, further more preferably 4 µm or larger, especially preferably 5 µm or larger, and most preferably 6 µm or larger. The average particle diameter of the char obtained after the crushing step of 100 µm or smaller is preferable, because the contact with the halogen compound may become easy, which leads to an increase of the demineralization efficiency and improvement of the activation effect, and the gases generated from the char derived from a plant may be easily removed during the thermal treatment. From the same viewpoint, the average particle diameter of the crushed char is more preferably 80 µm or smaller, further more preferably 60 µm or smaller, especially preferably 40 µm or smaller, extremely preferably 30 µm or smaller, and most preferably 20 µm or smaller. The average particle diameter ($D_{50}$) of the char obtained after the crushing step can be measured in the same manner as the method described for the average particle diameter ($D_{50}$) of the carbonaceous material.

The crusher used at the crushing step is not especially limited and, for example, a jet mill, a ball mill, a hammer mill, a rod mill or the like can be used. From the viewpoint of the crushing efficiency, a method of crushing in coexistence with crushing media such as a method using a ball mill or a bead mill is preferable and, from the viewpoint of the load on the equipment, use of a ball mill is preferable.

After the char derived from a plant is crushed, classification of the char may be conducted when necessary. By conducting the classification, it may be easy to obtain the char having the above specific surface area and the above average particle diameter, and it may become possible to adjust the average particle diameter and the average particle diameter of the obtained carbonaceous material more accurately. It is preferred that the specific surface area and the average particle diameter each is in the above ranges after the char derived from a plant is crushed and classified.

The average particle diameter of the carbonaceous material can also be more accurately adjusted by the classification step. For example, particles can thereby be removed that each have a particle diameter of 1 µm or smaller.

When the particles each having a particle diameter of 1 µm or smaller are removed by the classification, it is preferred for the carbonaceous material of the present invention that the content of the particles each having a particle diameter of 1 µm or smaller is set to be 3% by volume or less. The timing of the removal of the particles each having a particle diameter of 1 µm or smaller is not especially limited provided that the removal is conducted after the crushing, while the removal is preferably conducted concurrently with the classification during the crushing. As to the carbonaceous material of the present invention, from the viewpoint that the specific surface area is reduced and the irreversible capacity is reduced, the content of the particles each having a particle diameter of 1 µm or smaller is preferably 3% by volume or less, more preferably 2.5% by volume or less, and further more preferably 2% by volume or less.

The classification method is not especially limited. Examples thereof include, for example, classification using a sieve, wet classification, and dry classification. Examples of a wet classification machine include classification machines each using the principle of, for example, gravity classification, inertial classification, hydraulic classification, or centrifugal classification. Examples of the dry classification machine include dry classification machines each using the principle of, for example, sedimentation classification, mechanical classification, or centrifugal classification.

The crushing step and the classification step can also be conducted using one apparatus. The crushing step and the classification step can be conducted using, for example, a jet mill having a dry classification function. An apparatus including a crusher and a classifying machine that are independent from each other can also be used. In this case, the crushing and the classification can consecutively be conducted while the crushing and the classification can also be inconsecutively conducted.

The alkali impregnation step of adding a compound containing an alkali metal element may be conducted before the gas phase demineralization step of applying the thermal treatment to the char derived from a plant. Carbon erosion by the alkali metal element is facilitated and formation of fine pores is caused in the course of the increase of the temperature to reach the gas phase demineralization step, by conducting the alkali impregnation step. Concretely, not limiting to the mechanism described later, it can be considered that diffusion of the impregnated alkali metal into the char derived from a plant is started at the temperature in the vicinity of the melting point of the compound containing the alkali metal element, a dehydration reaction of the compound containing the alkali metal element and an erosion reaction of the carbon of the char by the compound containing the alkali metal element are started at a temperature in the vicinity of 500° C., and vaporization of the alkali metal element takes place at a temperature in the vicinity of the boiling point of the alkali metal element. When the alkali impregnation step is conducted, it is preferred that the crushing step of crushing the char derived from a plant is conducted before the alkali impregnation. The char obtained after the crushing step in this embodiment will hereinafter be also referred to as "crushed char".

At the alkali impregnation step, the compound containing the alkali metal element is added to the crushed char obtained at the crushing step to obtain the char having the alkali metal element impregnated thereinto (hereinafter, also referred to as "alkali-impregnated char"). The "compound containing the alkali metal element" is a compound that contains an alkali metal element (such as lithium, sodium, potassium, rubidium, or cesium) and examples thereof include, for example, halides (such as a fluoride, a chloride, and a bromide), hydroxides, carbonates, and hydrogen carbonates of the alkali metal element. Concretely, examples of the compound containing the alkali metal element include lithium chloride, sodium chloride, potassium chloride, rubidium chloride, cesium chloride, lithium hydroxide, sodium hydroxide, potassium hydroxide, rubidium hydroxide, cesium hydroxide, lithium carbonate, sodium carbonate, potassium carbonate, rubidium carbonate, cesium carbonate, sodium hydrogen carbonate, potassium hydrogen carbonate, rubidium hydrogen carbonate, and cesium hydrogen carbonate. Among these, from the viewpoints of performance for forming fine pores and safety, it is preferred that the compound containing the alkali metal element is a compound containing sodium or potassium. From the viewpoint of the excellent avidity with the crushed char, it is preferred that the compound containing the alkali metal element is a hydroxide, a carbonate, or a hydrogen carbonate of the alkali metal element. From the above viewpoints, the compound containing the alkali metal element is more preferably sodium, or a hydroxide or a carbonate of sodium, further more preferably, sodium hydroxide or sodium carbonate.

The method of adding the compound containing the alkali metal element to the crushed char is not especially limited. For example, the compound containing the alkali metal element may be added to the crushed char using a dry method or a wet method. From the viewpoint that it is easy to uniformly adhere the compound containing the alkali metal element to the crushed char, the wet addition method is preferably used.

With the dry addition method, the compound containing the alkali metal element in the form of a solid is added to and mixed with the crushed char, and an alkali-impregnated char can thereby be obtained. In this case, from the viewpoint that it is easy to uniformly adhere the compound containing the alkali metal element to the crushed char, it is preferred that this compound is added in the form of a powder to be mixed.

With the wet addition method, the compound containing the alkali metal element is dissolved in a solvent to prepare a solution and this solution is supported to the crushed char. For this support, the solution can be supported to the crushed char by immersing the crushed char in the solution, sparging (such as sparging by spraying) the solution to the crushed char, or adding the solution to the char and mixing the solution therewith. The support may be conducted by adding the alkali metal element in the form of a solid to a mixture of a solvent and the crushed char. After the support, the solvent may be evaporated when necessary. The alkali-impregnated char can be obtained by these treatment steps. The solvent is not especially limited. Examples thereof include, for example, water, alcoholic solvents (such as ethanol, methanol, ethylene glycol, and isopropyl alcohol), ester solvents (such as ethyl acetate, butyl acetate, and ethyl lactate), ether solvents (such as tetrahydrofuran, dimethoxyethane, and 1,4-dioxane), ketone solvents (such as acetone, 2-butanone, cyclopentanone, and cyclohexanone), aliphatic hydrocarbon solvents (such as pentane, hexane, and heptane), aromatic hydrocarbon solvents (such as toluene, xylene, and mesitylene), nitrile solvents (such as acetonitrile), and chlorinated hydrocarbon solvents (such as dichloromethane, chloroform, and chlorobenzene), and mixtures thereof. Water, alcoholic solvents, and mixtures thereof are each preferably used as the solvent because enhancement of the avidity of each of the solvent and the crushed char with each other is effective in order to uniformly adhere the compound containing the alkali metal element to the crushed char. The method of evaporating the solvent is not especially limited. Examples thereof include, for example, thermal treatment, reduced-pressure treatment, and a combination thereof. The temperature of the thermal treatment only has to be a temperature at which any oxidation of the crushed char hardly occurs, and the temperature differs depending on the type of the solvent. The temperature is, for example, 40 to 200° C., preferably 50 to 150° C., and more preferably 60 to 100° C.

The amount of the compound containing the alkali metal element to be impregnated into the crushed char (an impregnation amount) is preferably 0.5% by mass or more, more preferably 1% by mass or more, further preferably 3% by mass or more, and especially preferably 5% by mass or more such as, for example, 10% by mass or more, and preferably 20% by mass or less, more preferably 18% by mass or less, further preferably 17% by mass or less, and especially preferably 16% by mass or less such as, for example, 15% by mass or less, relative to the mass of the obtained alkali-impregnated char. When the amount of the compound containing the alkali metal element to be impregnated into the crushed char is equal to or more than the above lower limit, formation of the fine pores is easily facilitated at the subsequent gas phase demineralization step. When the amount of the compound containing the alkali metal element to be impregnated into the crushed char is equal to or less than the above upper limit, any excessive formation of the fine pores can be suppressed and the carbonaceous material may be easily obtained that provides a nonaqueous electrolyte secondary battery having a high charge-discharge capacity, and low resistance.

The average particle diameter ($D_{50}$) of the alkali-impregnated char obtained at the alkali impregnation step is preferably 2 to 100 μm, more preferably 3 to 80 μm, further more preferably 4 to 60 μm, especially preferably 4 to 40 μm, extremely preferably 5 to 30 μm, and most preferably 6 to 20 μm. When the average particle diameter of the alkali-impregnated char is equal to or larger than the above lower limit, this is preferable because scattering of the powders can be suppressed even when the calcining is conducted with a large gas flow amount. When the average particle diameter of the alkali-impregnated char is equal to or less than the above upper limit, this is preferable because the impregnated alkali compound may be easily removed at the gas phase demineralization step.

The specific surface area of the alkali-impregnated char obtained at the alkali impregnation step is preferably 100 to 800 m$^2$/g, more preferably 200 to 700 m$^2$/g, and further preferably 200 to 600 m$^2$/g. When the specific surface area of the alkali-impregnated char is equal to or more than the above lower limit, this is preferable because the fine pores of the carbonaceous material may be easily reduced and the hygroscopic property of the carbonaceous material may be easily decreased. When the specific surface area of the alkali-impregnated char is equal to or less than the above upper limit, the specific surface area of the obtained carbonaceous material may easily fall within the above ranges and the use efficiency of the lithium ions in the nonaqueous electrolyte secondary battery can be easily improved. In this specification, the specific surface area of the alkali-impregnated char can be measured using the BET method (the nitrogen adsorption BET multipoint method).

The average particle diameter of the alkali-impregnated char may be adjusted using the crushing and/or the classification. Examples of each of the crushing method and the classification method include the same methods as above.

When the alkali metal element remains in the carbonaceous material, the alkali metal element moves toward the side of the opposite pole of the nonaqueous secondary battery during discharging of this battery and, as a result, the performance of the battery may be degraded. The production method of the present invention may include a removal step of removing the compound containing the alkali metal element, while the content of the alkali metal element in the obtained carbonaceous material can be suppressed to be low even when the production method of the present invention does not include this removal step. Though the reason for this is not clear, it can be considered that the halogen compound introduced at the gas phase demineralization step and the alkali metal element react with each other, a reaction product having a relatively low melting point is thereby produced, and the reaction product is evaporated and removed by the thermal treatment in the gas phase demineralization step. The present invention is not limited by the above description.

In a case where the alkali impregnation step is conducted in addition to the gas phase demineralization step, not limiting at all to the mechanism described later, it can be considered that the functional groups such as an —OH group and a —COOH group on the surface of the char react with the compound containing the impregnated alkali metal element, and these functional groups are removed in the subsequent thermal treatment and gas phase demineralization step. It can be considered that, as a result, the oxygen element content and the hydrogen element content in the carbonaceous material can be easily reduced, any irreversible reaction can be easily suppressed during the charging and discharging, and the charge-discharge efficiency and the discharge capacity can be easily increased. In this case, the content of the oxygen element in the carbonaceous material is preferably 0.8% by mass or less, more preferably 0.7% by mass or less, further more preferably 0.65% by mass or less, and especially preferably 0.6% by mass or less. The content of the hydrogen element in the carbonaceous material is preferably 0.16% by mass or less, more preferably 0.14% by mass or less, further more preferably 0.12% by mass or less, and especially preferably 0.1% by mass or less. The content of each of the oxygen element and the hydrogen element in the carbonaceous material can be measured using, for example, an inert gas fusion method.

A negative pole for the nonaqueous electrolyte secondary battery of the present invention includes the carbonaceous material of the present invention.

A production method for the negative pole for the nonaqueous electrolyte secondary battery of the present invention will be concretely described below. The negative pole of the present invention can be produced by adding a binding agent (a binder) to the carbonaceous material of the present invention, adding an adequate solvent thereto in an adequate amount, kneading these components with each other to form an electrode mixture, thereafter applying the electrode mixture to a current collecting plate comprising a metal plate or the like, drying the current collecting plate, and thereafter pressure-forming the current collecting plate.

An electrode having high electric conductivity can be produced even without adding any conductive additive, by using the carbonaceous material of the present invention. In preparing the electrode mixture, a conductive additive can be added thereto when necessary, in order to impart higher electric conductivity to an electrode. An electrically conductive carbon black, a vapor-grown carbon fiber (VGCF), a nano-tube, or the like can be used as the conductive additive. The addition amount of the conductive additive differs depending on the type of the used conductive additive while, when the amount to be added is excessively small, no expected electric conductivity may be obtained and, when the amount to be added is excessively large, the dispersion in the electrode mixture may be degraded. From these viewpoints, the rate of the conductive additive to be added is preferably 0.5 to 10% by mass (in this case, it is assumed that "the amount of the active substance (the carbonaceous material)+the amount of the binder+the amount of the conductive additive=100% by mass"), further more preferably 0.5 to 7% by mass, and especially preferably 0.5 to 5% by mass. The binding agent is not especially limited provided that the binding agent is a substance that does not react with the electrolytic solution, such as polyvinylidene fluoride (PVDF), polytetrafluoroethylene, a mixture of styrene-butadiene rubber (SBR) and carboxymethyl cellulose (CMC), or the like. Among these, PVDF is preferably used because PVDF adhering to the surface of the active substance can little block the move of the lithium ions, and excellent input-output characteristics can be obtained. A polar solvent such as N-methylpyrrolidone (NMP) or the like is preferably used to dissolve PVDF to form slurry while a water-based emulsion such as SBR or an aqueous solution of CMC can also be used. When the addition amount of the binding agent is excessively large, the resistance of the obtained electrode may be high, the internal resistance of the battery therefore may become high, and the property of the battery may be degraded. When the addition amount of the binding agent is excessively small, the binding between the particles of the negative pole material and the binding between the negative pole material and the current collecting plate may be insufficient. The preferable addition amount of the binding agent differs depending on the type of the used binder. The addition amount thereof is, for example, for a PVDF-based binder, preferably 3 to 13% by mass and more preferably 3 to 10% by mass. On the other hand, as to a binder using water as its solvent, plural binders mixed with each other are often used such as a mixture of SBR and CMC, and the addition amount thereof is preferably 0.5 to 5% by mass and more preferably 1 to 4% by mass, as the total amount of all the used binders.

An electrode active substance layer is basically formed on each of both sides of the current collecting plate while the electrode active substance layer may be formed on one side thereof when necessary. A smaller current collecting plate, a smaller separator, and the like are sufficient as the electrode active substance layer is thicker, and thus this is preferable for setting a higher capacity. The input-output characteristics may however be degraded when the electrode active substance layer is excessively thick, because a larger electrode area facing the opposite pole is more advantageous for improving the input-output characteristics. From the viewpoint of the output during the discharging of the battery, the thickness of the active substance (per one side) is preferably 10 to 80 μM, more preferably 20 to 75 μm, and further more preferably 30 to 75 μm.

The nonaqueous electrolyte secondary battery of the present invention comprises a negative pole for the nonaqueous electrolyte secondary battery of the present invention. The nonaqueous electrolyte secondary battery comprising the negative pole for the nonaqueous electrolyte secondary battery comprising the carbonaceous material of the present invention has a high charge-discharge capacity, high charge-discharge efficiency, and low resistance. In a preferred embodiment of the present invention, the nonaqueous electrolyte secondary battery comprising the negative pole for the nonaqueous electrolyte secondary battery comprising the carbonaceous material has a high charge-discharge capacity, and high charge-discharge efficiency, and has low resistance that is maintained even after charge and discharge cycle.

When the negative pole for the nonaqueous electrolyte secondary battery is formed using the carbonaceous material of the present invention, the other materials constituting the battery such as the material of the positive pole, the separator, and the electrolytic solution are not especially limited, and various materials conventionally used or proposed as those of the nonaqueous solvent secondary battery can be used.

For example, composite metal chalcogen compounds are preferably used as the material of the positive pole, such as layered oxide-based compounds (each represented by $LiMO_2$ where M is a metal: such as, for example, $LiCoO_2$, $LiNiO_2$, or $LiMnO_2$, or $LiNi_xCo_yMo_zO_2$ (where x, y, and z represent compositional ratios)), olivine-based compounds (each represented by $LiMPO_4$ where M is a metal: such as, for example, $LiFePO_4$), and spinel-based compounds (each represented by $LiM_2O_4$ where M is a metal: such as, for example, $LiMn_2O_4$). These chalcogen compounds may be mixed to be used when necessary. Any of these materials of the positive pole is shaped together with an adequate binder and a carbon material to impart the electric conductivity to the electrode, to form a layer on an electrically conductive current collecting material, and the positive pole is thereby formed.

The nonaqueous solvent-based electrolytic solution used in combination with these positive pole and negative pole is generally formed by dissolving an electrolyte in a nonaqueous solvent. One of organic solvents or a mixture of two or more thereof can be used as the nonaqueous solvent, such as propylene carbonate, ethylene carbonate, dimethyl carbonate, diethyl carbonate, dimethoxyethane, diethoxyethane, γ-butyllactone, tetrahydrofuran, 2-methyltetrahydrofuran, sulfolane, or 1,3-dioxolan. $LiClO_4$, $LiPF_6$, $LiBF_4$, $LiCF_3SO_3$, $LiAsF_6$, LiCl, LiBr, $LiB(C_6H_6)_4$, $LiN(SO_3CF_3)_2$ or the like may be used as the electrolyte.

The nonaqueous electrolyte secondary battery is formed by placing the positive pole and the negative pole, that are generally formed as above, opposite to each other through, when necessary, a liquid-permeable separator comprising a non-woven cloth, another porous material, or the like, and immersing these components in the electrolytic solution. A liquid-permeable separator comprising a non-woven cloth or another porous material which is usually used in a secondary battery can be used as the separator. Otherwise, instead of the separator, or with the separator, a solid electrolyte can also be used that comprises a polymer gel having the electrolytic solution impregnated therein.

The carbonaceous material of the present invention is suitable for the carbonaceous material for a battery that is loaded on a vehicle such as, for example, an automobile (such as, typically, a nonaqueous electrolyte secondary battery for driving a vehicle). The "vehicle" in the present invention is not especially limited. Examples thereof include a vehicle usually known as an electric vehicle, or a hybrid vehicle using a fuel battery and an internal-combustion engine while the "vehicle" is provided with a power source apparatus comprising at least the above battery, an electric driving mechanism that is driven by the power source supply from the power source apparatus, and a control apparatus that controls these. In addition, the "vehicle" may be provided with a dynamic brake or a regenerative brake, and a mechanism that converts the energy generated by braking into electricity and that thereby charges the nonaqueous electrolyte secondary battery.

EXAMPLES

The present invention will be described below in detail with reference to Examples while these Examples do not limit the scope of the present invention. The measurement methods for the values of the physical properties of the carbonaceous material of the present invention will be described below. The values of the physical properties described herein that include the values in the Examples are based on the values determined in accordance with the following methods.

(Raman Spectrum)

Using a Raman spectrometer (that was a Raman spectrometer ("LabRAM ARAMIS (VIS)" manufactured by Horiba, Ltd.), the Raman spectrum was measured by setting the particles to be measured that were the carbonaceous material on a stage of an observation stand, setting the magnifying power of the objective lens so as to be 100 magnifications, conducting focusing, and applying an argon ion laser beam to the particles. The details of the measurement conditions were as follows. Raman spectra of carbon electrodes produced using the carbonaceous materials of Example 1 and Comparative Example 1 are depicted in FIG. 1 and FIG. 2, respectively.

Wavelength of Argon Ion Laser Beam: 532 nm
Laser Power on Specimen: 15 mW
Resolution: 5 to 7 $cm^{-1}$
Measurement Range: 50 to 2,000 $cm^{-1}$
Exposure Time Period: 1 second
Number of Integration Sessions: 100
Peak Intensity Measurement:
    Baseline correction, automatically corrected by Polynom-3 Grade Peak search and fitting process, GaussLoren
(Specific Surface Area by Nitrogen Adsorption BET Multi-point Method)

An approximate equation derived from the equation of BET is described below.

$$\frac{p/p_0}{v(1 - p/p_0)} = \frac{1}{v_m c} + \frac{(c-1)p}{v_m c p_0} \quad [\text{Eq. 1}]$$

Using the above approximate equation, $v_m$ was determined by assigning an adsorption amount (v) actually measured at a predetermined relative pressure ($p/p_0$) in accordance with the multipoint method based on the nitrogen adsorption at the temperature of liquid nitrogen, and the specific surface area of the specimen was calculated in accordance with the following equation.

$$\text{Specific surface area} = \left(\frac{v_m N a}{22400}\right) \times 10^{-18} \quad [\text{Eq. 2}]$$

In the above equations, $v_m$ is the adsorption amount (cm$^3$/g) necessary for forming a monomolecular layer on the surface of the specimen, v is the adsorption amount (cm$^3$/g) actually measured, $p_0$ is the saturated vapor pressure, p is the absolute pressure, c is a constant (reflecting the adsorption heat), N is the Avogadro number of $6.022 \times 10^{23}$, and "a" (nm$^2$) is the area of the surface of the specimen that is occupied by the adsorbate molecules (cross-sectional area occupied by the molecules).

Concretely, using "Autosorb-iQ-MP" manufactured by Quantachrome, the adsorption amount of nitrogen to the char derived from a plant or the carbonaceous material at the temperature of liquid nitrogen was measured as below. A specimen tube was filled with the char derived from a plant or the carbonaceous material that was the measurement specimen and, in the state where the specimen tube was cooled to −196° C., the pressure in the specimen tube was once reduced. Then, nitrogen (having purity of 99.999%) was adsorbed to the measurement specimen at each of desired relative pressures. The nitrogen amount adsorbed to the specimen at the time when the pressure reached an equilibrium pressure at each of the desired relative pressures was defined as the adsorption gas amount v.

($^7$Li Nucleus Solid-State NMR)

N-methyl-2-pyrolidone was added to 94 parts by mass of a carbonaceous material prepared in each of Examples and Comparative Examples described later and 6 parts by mass of polyvinylidene fluoride to obtain a paste-like substance. This paste-like substance was applied on a film so as to have a uniform thickness, to be dried and pressed. The obtained pressed article was peeled off from the film and was punched out so as to have a circular plate shape having a diameter of 14 mm, to obtain a carbon electrode. This carbon electrode was used as the positive pole. An article was formed by punching out a metal lithium thin film having a thickness of 0.2 mm so as to have a circular plate shape having a diameter of 14 mm, and the article was used as the negative pole. A solution was prepared by adding LiClO$_4$ at a rate of 1 mol/L to a mixture solvent obtained by mixing ethylene glycol dimethyl ether and propylene carbonate with each other at a volume ratio of 1:1, and the solution was used as the electrolytic solution. A fine-porous film comprising polypropylene was used as a separator. The separator was sandwiched between the carbon electrode and the negative pole, and the electrolytic solution was poured to assemble a coin cell.

Using the assembled coin cell, doping was conducted in an electricity amount of 0.2 mA/cm$^2$ as the current density until terminal voltage reached 0 mV. Charging was thereafter conducted until the specific capacity became 1,000 mAh/g, to thereby obtain the carbon electrode that had lithium ions doped therein so as to establish the fully charged state. After completion of doping, the doping was discontinued for 2 hours, and, under an argon atmosphere, the carbon electrode was taken out, the electrolytic solution was wiped out, and all the obtained carbon electrodes were put in a sample tube for NMR.

For the NMR analysis, measurement of MAS-$^7$Li-NMR was conducted using a nuclear magnetic resonance apparatus ("AVANCE 300" manufactured by BRUKER). For this measurement, lithium chloride was used as the reference substance and the peak of lithium chloride was set so as to be at 0 ppm. The NMR spectra of the carbon electrodes produced using the carbonaceous materials of Example 1 and Comparative Example 1 are depicted in FIG. 3 and FIG. 4, respectively.

(Metal Content)

As to the measurement method for each of the calcium element content and the potassium element content, for example, the measurement was conducted in accordance with the following method. A carbon specimen comprising predetermined amounts of calcium element and potassium element was prepared in advance, and calibration curves were produced for the relation between the intensity of the calcium Kα-line and the calcium element content and the relation between the intensity of the potassium Kα-line and the potassium element content, using a fluorescent X-ray analyzer. For the specimen, the intensities of the calcium Kα-line and the potassium Kα-line in the fluorescent X-ray analysis were thereafter measured to determine the calcium element content and the potassium element content using the calibration curves produced previously. The fluorescent X-ray analysis was conducted using "ZSX Primus-μ" manufactured by Rigaku Corporation and under the following conditions. A holder for a top irradiation method was used and the measurement area of the specimen was set so as to be in a circumference having a diameter of 30 mm. 2.0 g of the specimen to be measured and 2.0 g of a polymer binder (Spectro Blend 44μ Powder produced by Chemplex) were mixed with each other in a mortar and were put in a molding machine. A load of 15 ton was applied on the molding machine for 1 minute to produce a pellet having a diameter of 40 mm. The produced pellet was wrapped by a polypropylene film and this article was placed in a specimen holder to conduct the measurement. The X-ray source was set so as to operate at 40 kV and 75 mA. As to the calcium element, using LiF (200) as the dispersive crystal and using a gas-flow proportional counter tube as the detector, the measurement was conducted for the range for 2θ to be 110 to 116° and at the scanning rate of 30°/min. As to the potassium element, using LiF (200) as the dispersive crystal and using a gas-flow proportional counter tube as the detector, the measurement was conducted for the range for 20 to be 133 to 140° and at the scanning rate of 4°/min.

(True Density Based on Butanol Method)

The true density $\rho_{Bt}$ was measured based on the butanol method in accordance with the method defined in JIS R 7212. The mass (m$_1$) of a specific gravity bottle with a side tube that had an internal volume of about 40 mL was accurately weighed. The specimen was flatly placed on the bottom portion of the bottle so as to have a thickness of about 10 mm, and the mass ($m_2$) thereof was accurately weighed. 1-butanol was calmly added to this so as to have a depth of about 20 mm from the bottom. Mild vibrations were applied to the specific gravity bottle and it was confirmed that generation of any large gas bubble stopped. The bottle was thereafter put in a vacuum desiccator and the gas therein was gradually removed to establish 2.0 to 2.7 kPa. This pressure was maintained for 20 minutes or longer and, after the generation of any gas bubble stopped, the specific gravity bottle was taken out and was further filled with 1-butanol. The bottle was plugged and submerged in a constant-temperature bath (whose temperature was adjusted to be 30±0.03° C.) for 15 minutes or longer to match the liquid level of 1-butanol with the gauge line. The bottle was taken out, the outer side thereof was sufficiently wiped, and the bottle was cooled to the room temperature. The mass ($m_4$) thereof was thereafter accurately weighed. The same specific gravity bottle as the above specific gravity bottle was filled with only 1-butanol. In the same manner as above, this bottle was submerged in the constant-temperature bath, the gauge line was matched, and the mass ($m_3$) thereof was thereafter weighed. Distilled water, which boiled immediately before the use to remove the gases dissolved therein, was added to a specific gravity bottle. In the same manner as above, this bottle was submerged in the constant-temperature bath, the gauge line was matched, and the mass ($m_5$) thereof was thereafter weighed. The true density $\rho_{Bt}$ was calculated in accordance with the following equation. In the equation, d was the specific gravity of water at 30° C. (0.9946).

$$\rho_{Bt} = \frac{m_2 - m_1}{m_2 - m_1 - (m_4 - m_3)} \times \frac{m_3 - m_1}{m_5 - m_1} d \quad \text{[Eq. 3]}$$

(Micro Pore Volume and Meso Pore Volume in Accordance with DFT Method)

Using "Autosorb-iQ-MP" manufactured by Quantachrome, the carbonaceous material was heated at 300° C. for 12 hours at a reduced pressure and, nitrogen adsorption and desorption isothermal lines of the carbonaceous material at 77K were thereafter measured. The micro pore volume and the meso pore volume were calculated by applying the DFT method to the obtained nitrogen adsorption and desorption isothermal lines.

(Average Particle Diameter in Accordance with Laser Scatter Method)

The average particle diameter (the particle size distribution) of each of the char derived from a plant and the carbonaceous material was measured in accordance with the following method. The specimen was put in an aqueous solution comprising a surfactant ("ToritonX-100" produced by Wako Pure Chemical Corporation) at 5% by mass and was treated using an ultrasonic cleaner for 10 minutes or longer to be dispersed in the aqueous solution. The particle size distribution was measured using this dispersion liquid. The measurement of the particle size distribution was conducted using a particle diameter and particle size distribution measuring apparatus ("Microtrac MT3300EX II" manufactured by MicrotracBEL Corporation)". $D_{50}$ is the particle size with which the accumulated volume is 50%, and this value was used as the average particle diameter.

Production Example 1

A palm shell was crushed and was dry-distilled at 500° C. under a nitrogen gas atmosphere to obtain a palm shell char having a particle diameter of 0.5 to 2.0 mm. The palm shell char was thereafter crushed using a ball mill to obtain a palm shell crushed char having the average particle diameter ($D_{50}$) of 10 μm. The specific surface area determined in accordance with the BET multipoint method was 389 m$^2$/g.

Example 1

Thermal treatment was applied to the palm shell char obtained in Production Example 1 at 1,200° C. for 60 minutes in a gas flow of a nitrogen gas containing a hydrogen chloride gas at 2% by volume. The supply amount of the nitrogen gas containing the hydrogen chloride gas at 2% by volume was 18 L/min per 50 g of the palm shell char. Only the supply of the hydrogen chloride gas was thereafter stopped and deacidification treatment was conducted by applying thermal treatment at 1,200° C. for 60 minutes to obtain a carbonaceous material. The supply amount of the nitrogen gas in the deacidification treatment was 18 L/min per 50 g of the palm shell char. The palm shell char was thereafter crushed using a ball mill to obtain a carbonaceous material having the average particle diameter $D_{50}$ of 9 μm.

Example 2

A carbonaceous material was obtained in the same manner as Example 1 except that a nitrogen gas containing a hydrogen chloride gas at 1% by volume was used instead of the nitrogen gas containing a hydrogen chloride gas at 2% by volume.

Example 3

A carbonaceous material was obtained in the same manner as Example 1 except that the supply amount of the nitrogen gas containing a hydrogen chloride gas at 2% by volume and the supply amount of the nitrogen gas in the deacidification treatment were each set to be 16 L/min per 50 g of the palm shell char.

Example 4

A carbonaceous material was obtained in the same manner as Example 3 except that a nitrogen gas containing a hydrogen chloride gas at 1% by volume was used instead of the nitrogen gas containing a hydrogen chloride gas at 2% by volume.

Example 5

The palm shell char obtained in Production Example 1 was mixed with an aqueous solution containing dissolved NaOH at 10% by mass based on the mass of the palm shell char. An ultrasonic wave was applied to the mixture for 30 minutes to cause the solution to infiltrate into the char and the mixture was thereafter reduced-pressure-dried at 80° C. for 8 hours at a reduced pressure of 1 Torr. Thermal treatment was applied to the obtained mixture at 1,200° C. for 60 minutes in a gas flow of a nitrogen gas containing a hydrogen chloride gas at 1% by volume. The supply amount of the nitrogen gas containing a hydrogen chloride gas at 1% by volume was 16.2 L/min per 50 g of the mixture of 50.0 g of the palm shell char and 5.55 g of NaOH, and was 18 L/min per 50 g of the palm shell char. Only the supply of the hydrogen chloride gas was thereafter stopped and deacidification treatment was conducted by applying thermal treatment at 1,200° C. for 60 minutes to obtain a carbonaceous material. The supply amount of the nitrogen gas in the deacidification treatment was 16.2 L/min per 50 g of the mixture of 50.0 g of the palm shell char and 5.55 g of NaOH, and was 18 L/min per 50 g of the palm shell char.

Comparative Example 1

A carbonaceous material was obtained in the same manner as Example 1 except that the supply amount of the nitrogen gas containing a hydrogen chloride gas at 2% by volume and the supply amount of the nitrogen gas in the deacidification treatment were each set to be 10 L/min per 50 g of the palm shell char.

Comparative Example 2

A carbonaceous material was obtained in the same manner as Comparative Example 1 except that the temperature of the thermal treatment was set to be 900° C.

Comparative Example 3

Thermal treatment was applied to the palm shell char obtained in Production Example 1 at 900° C. for 60 minutes in a gas flow of a nitrogen gas containing a hydrogen chloride gas at 2% by volume. The supply amount of the nitrogen gas containing a hydrogen chloride gas at 2% by volume was 10 L/min per 50 g of the palm shell char. Only the supply of the hydrogen chloride gas was thereafter stopped and deacidification treatment was conducted by applying thermal treatment at 900° C. for 60 minutes. The supply amount of the nitrogen gas in the deacidification treatment was 10 L/min per 50 g of the palm shell char. Further thermal treatment was applied to the obtained carbonaceous material at 1,200° C. for 60 minutes in a gas flow of a nitrogen gas. The supply amount of the nitrogen gas in the further thermal treatment was 1.0 L/min per 50 g of the palm shell char.

Comparative Example 4

Thermal treatment was applied to the palm shell char obtained in Production Example 1 at 975° C. for 70 minutes in a gas flow of a nitrogen gas containing a hydrogen chloride gas at 1% by volume. The supply amount of the nitrogen gas containing a hydrogen chloride gas at 1% by volume was 10 L/min per 50 g of the palm shell char. Only the supply of the hydrogen chloride gas was thereafter stopped and deacidification treatment was conducted by applying thermal treatment at 975° C. for 40 minutes. The supply amount of the nitrogen gas in the deacidification treatment was 10 L/min per 50 g of the palm shell char. Further thermal treatment was applied to the obtained carbonaceous material at 1,000° C. for 360 minutes in a gas flow of a nitrogen gas. The supply amount of the nitrogen gas in the further thermal treatment was 1.5 L/min per 50 g of the palm shell char.

The physical properties of each of the carbonaceous materials obtained in Examples 1 to 5 and Comparative Examples 1 to 4 are shown in Table 1.

TABLE 1

|  |  | Half-Value Width [cm$^{-1}$] | Specific Surface Area [m$^2$/g] | NMR Shift Value [ppm] | True Density [g/cm$^3$] | K Content [ppm] | Ca Content [ppm] | Average Particle Diameter D$_{50}$ [μm] |
|---|---|---|---|---|---|---|---|---|
| Example | 1 | 222 | 71 | 133 | 1.48 | <10 | 25 | 9 |
|  | 2 | 218 | 52 | 132 | 1.47 | <10 | 30 | 8 |
|  | 3 | 210 | 48 | 129 | 1.47 | <10 | 24 | 10 |
|  | 4 | 206 | 28 | 126 | 1.48 | <10 | 32 | 9 |
|  | 5 | 229 | 86 | 138 | 1.46 | <10 | 35 | 8 |
| Comparative Example | 1 | 179 | 22 | 108 | 1.48 | <10 | 30 | 8 |
|  | 2 | 263 | 250 | 110 | 1.42 | 72 | 228 | 8 |
|  | 3 | 174 | 21 | 107 | 1.47 | 75 | 231 | 7 |
|  | 4 | 234 | 129 | 105 | 1.44 | <10 | 162 | 8 |

(Production Method for Electrode)

A negative pole was produced in accordance with the following procedure using each of the carbonaceous materials obtained in Examples 1 to 5 and Comparative Examples 1 to 4.

96 parts by mass of the carbonaceous material, 4 parts by mass of polyvinylidene fluoride (PVDF), and 90 parts by mass of N-methylpyrrolidone (NMP) were mixed with each other to obtain a slurry. The obtained slurry was applied to a copper foil having a thickness of 14 μm, dried and pressed to obtain an electrode having a thickness of 75 μm. The density of the obtained electrode was 0.8 to 1.0 g/cm$^3$.

(Impedance)

Using each of the electrodes produced in the above and using an electrochemical measuring apparatus ("1255 WB High Performance Electrochemical Measurement System" manufactured by Solartron), an amplitude of 10 mV with 0 V as the center was supplied at 25° C. to measure the constant-voltage alternating current impedance at a frequency of from 10 mHz to 1 MHz, and the real-part resistance was measured at each of frequencies 1 kHz, 1 Hz and 0.1 Hz as the impedance resistance.

(Direct Current Resistance Value, Battery Initial Capacity, and Charge-Discharge Efficiency)

The electrode produced in the above was used as the working electrode, and metal lithium was used as the opposite electrode and the reference electrode. Propylene carbonate and ethylene glycol dimethyl ether were mixed with each other at a volume ratio of 1:1 to use the mixture as a solvent. 1 mol/L of LiClO$_4$ was dissolved in this solvent, and LiClO$_4$ was used as an electrolyte. A polypropylene film was used as the separator. A coin cell was assembled in a glove box under an argon atmosphere.

For the lithium secondary battery having the above configuration, after measuring its direct current resistance value before its initial charge, a charging and discharging test was conducted using a charging and discharging testing apparatus ("TOSCAT" manufactured by Toyo System Co., Ltd.). The doping of lithium was conducted at a rate of 70 mA/g relative to the mass of the active substance, and the doping was continued until the voltage reached 1 mV relative to the electric potential of lithium. A constant voltage of 1 mV relative to the potential of lithium was further applied for 8 hours and the doping was terminated. The capacity (mAh/g) at this time was defined as the charge capacity. Dedoping was conducted at a rate of 70 mA/g relative to the mass of the active substance until the voltage reached 2.5 V relative to the electric potential of lithium, and the capacity for the discharging at this time was defined as the discharge capacity. The percentage of "the discharge capacity/the charge capacity" was defined as the charge-discharge efficiency (the initial charge-discharge efficiency), and used as an index of the use efficiency of the lithium ions in the battery. The obtained results are shown in Table 2.

TABLE 2

| | | Direct Current Resistance Value | Impedance [Ω] | | | Charge and Discharge | | |
|---|---|---|---|---|---|---|---|---|
| | | | | | | Discharge Capacity | Irreversible Capacity | Efficiency |
| | | [Ω] | 1 kHz | 1 Hz | 0.1 Hz | [mAh/g] | [mAh/g] | [%] |
| Example | 1 | 521 | 11 | 29 | 33 | 489 | 79 | 86.1 |
| | 2 | 546 | 10 | 31 | 34 | 488 | 78 | 86.2 |
| | 3 | 652 | 12 | 32 | 30 | 484 | 77 | 86.3 |
| | 4 | 672 | 11 | 30 | 35 | 480 | 77 | 86.2 |
| | 5 | 422 | 9 | 27 | 32 | 493 | 73 | 87.1 |
| Comparative Example | 1 | 1109 | 13 | 48 | 50 | 450 | 84 | 84.2 |
| | 2 | 1037 | 12 | 62 | 66 | 432 | 145 | 74.9 |
| | 3 | 975 | 26 | 55 | 58 | 371 | 82 | 81.8 |
| | 4 | 250 | 18 | 52 | 54 | 337 | 179 | 65.3 |

The batteries assembled using the carbonaceous materials of Examples 1 to 5 each had a low resistance value and each presented a high discharge capacity and excellent charge-discharge efficiency. On the other hand, as to the batteries assembled using the carbonaceous materials of Comparative Examples 1 to 4 that did not have any half-value width in the predetermined range or that did not have any specific surface area in the predetermined range, any sufficiently low resistance value was not achieved or the discharge capacity and the charge-discharge efficiency were not sufficient.

Production Example 2

A palm shell was crushed and was dry-distilled at 500° C. under a nitrogen gas atmosphere to obtain a palm shell char having a particle diameter of 0.5 to 2.0 mm. The palm shell char was thereafter crushed using a ball mill to obtain a crushed palm shell char having the average particle diameter ($D_{50}$) of 10 μm. The specific surface area determined in accordance with the BET multipoint method was 391 m²/g.

Example 6

Thermal treatment was applied to the palm shell char obtained in Production Example 2 at 1,200° C. for 70 minutes in a gas flow of a nitrogen gas containing a hydrogen chloride gas at 2% by volume. The supply amount of the nitrogen gas containing a hydrogen chloride gas at 2% by volume was 18 L/min per 50 g of the palm shell char. Only the supply of the hydrogen chloride gas was thereafter stopped and deacidification treatment was conducted by applying thermal treatment at 1,200° C. for 70 minutes to obtain a carbonaceous material. The supply amount of the nitrogen gas in the deacidification treatment was 18 L/min per 50 g of the palm shell char. The palm shell char was crushed using a ball mill to thereby obtain a carbonaceous material having the average particle diameter $D_{50}$ of 10 μm.

Example 7

A carbonaceous material was obtained in the same manner as Example 6 except that a nitrogen gas containing a hydrogen chloride gas at 1% by volume was used instead of the nitrogen gas containing a hydrogen chloride gas at 2% by volume.

Example 8

A carbonaceous material was obtained in the same manner as Example 6 except that the supply amount of the nitrogen gas containing a hydrogen chloride gas at 2% by volume and the supply amount of the nitrogen gas in the deacidification treatment were each set to be 16 L/min per 50 g of the palm shell char.

Example 9

A carbonaceous material was obtained in the same manner as Example 8 except that a nitrogen gas containing a hydrogen chloride gas at 1% by volume was used instead of the nitrogen gas containing a hydrogen chloride gas at 2% by volume.

Example 10

The palm shell char obtained in Production Example 2 was mixed with an aqueous solution containing dissolved NaOH at 10% by mass based on the mass of the palm shell char. An ultrasonic wave was applied to the mixture for 30 minutes to cause the solution to infiltrate into the char and the mixture was thereafter reduced-pressure-dried at 80° C. for 8 hours at a reduced pressure of 1 Torr. Thermal treatment was applied to the obtained mixture at 1,200° C. for 70 minutes in a gas flow of a nitrogen gas containing a hydrogen chloride gas at 2% by volume. The supply amount of the nitrogen gas containing a hydrogen chloride gas at 1% by volume was 16.2 L/min per 50 g of the mixture of 50.0 g of the palm shell char and 5.55 g of NaOH, and was 18 L/min per 50 g of the palm shell char. Only the supply of the hydrogen chloride gas was thereafter stopped and deacidification treatment was conducted by applying thermal treatment at 1,200° C. for 70 minutes to obtain a carbonaceous material. The supply amount of the nitrogen gas in the deacidification treatment was 16.2 L/min per 50 g of the mixture of 50 g of the palm shell char and 5.55 g of NaOH, and was 18 L/min per 50 g of the palm shell char.

Comparative Example 5

A carbonaceous material was obtained in the same manner as Example 6 except that the supply amount of the nitrogen gas containing a hydrogen chloride gas at 2% by volume and the supply amount of the nitrogen gas in the deacidification treatment were each set to be 10 L/min per 50 g of the palm shell char.

Comparative Example 6

A carbonaceous material was obtained in the same manner as Comparative Example 5 except that the temperature of the thermal treatment was set to be 900° C.

Comparative Example 7

Thermal treatment was applied to the palm shell char obtained in Production Example 2 at 900° C. for 60 minutes in a gas flow of a nitrogen gas containing a hydrogen chloride gas at 2% by volume. The supply amount of the nitrogen gas containing a hydrogen chloride gas at 2% by volume was 10 L/min per 50 g of the palm shell char. Only the supply of the hydrogen chloride gas was thereafter stopped and deacidification treatment was conducted by applying thermal treatment at 900° C. for 60 minutes. The supply amount of the nitrogen gas in the deacidification treatment was 10 L/min per 50 g of the palm shell char. Further thermal treatment was applied to the obtained carbonaceous material at 1,200° C. for 60 minutes in a gas flow of a nitrogen gas. The supply amount of the nitrogen gas in the further thermal treatment was 1.0 L/min per 50 g of the palm shell char.

Comparative Example 8

Thermal treatment was applied to the palm shell char obtained in Production Example 2 at 975° C. for 70 minutes in a gas flow of a nitrogen gas containing a hydrogen chloride gas at 1% by volume. The supply amount of the nitrogen gas containing a hydrogen chloride gas at 1% by volume was 10 L/min per 50 g of the palm shell char. Only the supply of the hydrogen chloride gas was thereafter stopped and deacidification treatment was conducted by applying thermal treatment at 975° C. for 40 minutes. The supply amount of the nitrogen gas in the deacidification treatment was 10 L/min per 50 g of the palm shell char. Further thermal treatment was applied to the obtained carbonaceous material at 1,000° C. for 360 minutes in a gas flow of a nitrogen gas. The supply amount of the nitrogen gas in the further thermal treatment was 1.5 L/min per 50 g of the palm shell char.

The physical properties of each of the carbonaceous materials obtained in Examples 6 to 10 and Comparative Examples 5 to 8 are shown in Table 3 and Table 4.

96 parts by mass of the carbonaceous material, 4 parts by mass of polyvinylidene fluoride (PVDF), and 90 parts by mass of N-methylpyrrolidone (NMP) were mixed with each other to obtain a slurry. The obtained slurry was applied to a copper foil having a thickness of 14 μm, dried and pressed to obtain an electrode having a thickness of 75 μm. The density of the obtained electrode was 0.8 to 1.0 g/cm$^3$.

(Impedance)

Using each of the electrodes produced in the above and using an electrochemical measuring apparatus ("1255 WB High Performance Electrochemical Measurement System" manufactured by Solartron), an amplitude of 10 mV with 0 V as the center was supplied at 25° C. to measure the constant-voltage alternating current impedance at a frequency of from 10 mHz to 1 MHz, and the real-part resistance at each of frequencies of 1 kHz, 1 Hz and 0.1 Hz was measured as the impedance resistance.

(Direct Current Resistance Value, Battery Initial Capacity, and Charge-Discharge Efficiency)

Each of the electrodes produced in the above was used as the working electrode, and metal lithium was used as the opposite electrode and the reference electrode. Propylene carbonate and ethylene glycol dimethyl ether were mixed with each other at a volume ratio of 1:1 to use this mixture as a solvent. 1 mol/L of $LiClO_4$ was dissolved in this solvent, and $LiClO_4$ was used as an electrolyte. A polypropylene film was used as the separator. A coin cell was assembled under a glove box under an argon atmosphere.

For the lithium secondary battery having the above configuration, after measuring its direct current resistance value before its initial charge, a charging and discharging test was conducted using a charging and discharging testing apparatus ("TOSCAT" manufactured by Toyo System Co., Ltd.). Doping of lithium was conducted at a rate of 70 mA/g relative to the mass of the active substance, and the doping was continued until the voltage reached 1 mV relative to the electric potential of lithium. A constant voltage of 1 mV relative to the potential of lithium was further applied for 8 hours and the doping was terminated. The capacity (mAh/g) at this time was defined as the charge capacity. Dedoping was conducted at a rate of 70 mA/g relative to the mass of the active substance until the voltage reached 2.5 V relative to the potential of lithium, and the capacity for discharging at this time was defined as the discharge capacity. The percentage of "the discharge capacity/the charge capacity" was defined as the charge-discharge efficiency (the initial

TABLE 3

| | | Half-Value Width [cm$^{-1}$] | Pore Volume | | | NMR Shift Value [ppm] | True Density [g/cm$^3$] | K Content [ppm] | Ca Content [ppm] | Average | |
|---|---|---|---|---|---|---|---|---|---|---|---|
| | | | Micro Pore Volume [mL/g] | Meso Pore Volume [mL/g] | Meso Pore Volume/Micro Pore Volume | | | | | Particle Diameter $D_{50}$ [μm] | Specific Surface Area [m$^2$/g] |
| Example | 6 | 221 | 0.011 | 0.020 | 1.82 | 132 | 1.49 | <10 | 25 | 10 | 65 |
| | 7 | 217 | 0.005 | 0.011 | 2.20 | 131 | 1.48 | <10 | 30 | 8 | 45 |
| | 8 | 209 | 0.033 | 0.052 | 1.56 | 135 | 1.45 | <10 | 34 | 9 | 42 |
| | 9 | 205 | 0.024 | 0.040 | 1.67 | 123 | 1.49 | <10 | 33 | 9 | 21 |
| | 10 | 228 | 0.031 | 0.051 | 1.65 | 139 | 1.47 | <10 | 31 | 8 | 75 |
| Comparative Example | 5 | 179 | 0.012 | 0.004 | 0.35 | 108 | 1.48 | <10 | 30 | 8 | 22 |
| | 6 | 263 | 0.056 | 0.052 | 0.92 | 110 | 1.42 | 72 | 228 | 8 | 250 |
| | 7 | 174 | 0.023 | 0.017 | 0.73 | 107 | 1.47 | 75 | 231 | 7 | 21 |
| | 8 | 234 | 0.048 | 0.041 | 0.86 | 105 | 1.44 | <10 | 162 | 8 | 129 |

(Production Method for Electrode)

A negative pole was produced in accordance with the following procedure using each of the carbonaceous materials obtained in Examples 6 to 10 and Comparative Examples 5 to 8.

charge-discharge efficiency), and used as an index of the use efficiency of the lithium ions in the battery. After cycling the above charging and discharging for three times, the measurement of the impedance was conducted. The obtained results are shown in Table 4.

TABLE 4

| | | Charge and Discharge | | | Direct Current | Impedance [Ω] | | | | | |
|---|---|---|---|---|---|---|---|---|---|---|---|
| | | Discharge Capacity | Irreversible Capacity | Efficiency | Resistance Value | Before Initial Charge | | | After 3 Times of Charge and Discharge | | |
| | | [mAh/g] | [mAh/g] | [%] | [Ω] | 1 kHz | 1 Hz | 0.1 Hz | 1 kHz | 1 Hz | 0.1 Hz |
| Example | 6 | 487 | 78 | 86.2 | 518 | 12 | 28 | 33 | 5.4 | 6.4 | 7.0 |
| | 7 | 485 | 78 | 86.1 | 548 | 11 | 32 | 34 | 5.6 | 6.6 | 7.2 |
| | 8 | 489 | 79 | 86.1 | 661 | 11 | 33 | 35 | 5.5 | 6.7 | 7.3 |
| | 9 | 480 | 78 | 86.0 | 679 | 10 | 32 | 37 | 5.7 | 6.9 | 7.5 |
| | 10 | 493 | 74 | 87.0 | 423 | 10 | 29 | 32 | 5.1 | 6.5 | 6.9 |
| Comparative Example | 5 | 450 | 84 | 84.2 | 1,109 | 13 | 48 | 50 | 5.9 | 8.2 | 9.6 |
| | 6 | 432 | 145 | 74.9 | 1,037 | 12 | 62 | 66 | 5.8 | 8.8 | 11.1 |
| | 7 | 371 | 82 | 81.8 | 975 | 26 | 55 | 58 | 6.2 | 8.3 | 10.1 |
| | 8 | 337 | 179 | 65.3 | 250 | 18 | 52 | 54 | 5.3 | 7.1 | 8.8 |

The batteries assembled using the carbonaceous materials of Examples 6 to 10 each had a low resistance value before the initial charge thereof and after three times of charging and discharging thereof, and each presented a high discharge capacity and excellent charge-discharge efficiency. On the other hand, as to the batteries assembled using the carbonaceous materials of Comparative Examples 5 to 8 that did not have any half-value width in the predetermined range or that did not have any ratio of "the meso pore volume/the micro pore volume" in the predetermined range, any sufficiently low resistance value before the initial charge thereof and after three times of charging and discharging thereof was not achieved or the discharge capacity and the charge-discharge efficiency were not sufficient.

The invention claimed is:

1. A carbonaceous material, wherein the carbonaceous material is derived from a plant, a value of a half-value width of a peak in a vicinity of 1,360 cm$^{-1}$ in a Raman spectrum observed using laser Raman spectroscopy is from 190 to 240 cm$^{-1}$, and a specific surface area determined in accordance with a nitrogen adsorption BET multipoint method is from 10 to 100 m$^2$/g, and wherein a ratio of meso pore volume to micro pore volume each calculated in accordance with DFT method is 1.0 or greater.

2. The carbonaceous material according to claim 1, wherein when lithium is doped into said carbonaceous material until a full charge state is established and a $^7$Li nucleus solid-state NMR analysis is conducted for the carbonaceous material, a main resonance peak is observed that is shifted toward a low magnetic field side by 115 to 145 ppm relative to a resonance peak of a reference substance LiCl.

3. The carbonaceous material according to claim 1, wherein a calcium element content is 50 ppm or less.

4. The carbonaceous material according to claim 1, wherein a true density determined in accordance with a butanol method is from 1.35 to 1.70 g/cm$^3$.

5. A negative pole, comprising:
the carbonaceous material according to claim 1.

6. A nonaqueous electrolyte secondary battery, comprising:
the negative pole according to claim 5.

7. A method for producing the carbonaceous material according to claim 1, the method comprising:
applying thermal treatment to a char derived from a plant at from 1,100 to 1,300° C. in a gas flow of an inert gas comprising a halogen compound,
wherein a supply amount of the inert gas is 14 L/min or more per 50 g of the char derived from a plant.

* * * * *